US009986852B2

(12) United States Patent
Chenoweth et al.

(10) Patent No.: US 9,986,852 B2
(45) Date of Patent: Jun. 5, 2018

(54) PRODUCT DISPLAY SYSTEMS

(71) Applicant: Stein Industries, Inc., Brooklyn Park, MN (US)

(72) Inventors: Mark Chenoweth, Brooklyn Park, MN (US); Dan Duellman, Brooklyn Park, MN (US)

(73) Assignee: Stein Industries, Inc., Brooklyn Park, MN (US)

(*) Notice: Subject to any disclaimer, the term of this patent is extended or adjusted under 35 U.S.C. 154(b) by 0 days. days.

(21) Appl. No.: 15/599,172

(22) Filed: May 18, 2017

(65) Prior Publication Data

US 2018/0103774 A1 Apr. 19, 2018

Related U.S. Application Data

(60) Provisional application No. 62/507,547, filed on May 17, 2017, provisional application No. 62/408,465, filed on Oct. 14, 2016.

(51) Int. Cl.

| | |
|---|---|
| ***F25D 27/00*** | (2006.01) |
| ***A47F 1/12*** | (2006.01) |
| ***A47F 5/10*** | (2006.01) |
| ***F16M 13/02*** | (2006.01) |
| ***A47F 3/00*** | (2006.01) |
| ***F21V 23/00*** | (2015.01) |

(Continued)

(52) U.S. Cl.

CPC .............. *A47F 1/126* (2013.01); *A47F 3/001* (2013.01); *A47F 5/105* (2013.01); *F16M 13/022* (2013.01); *F21V 17/105* (2013.01); *F21V 21/088* (2013.01); *F21V 23/001* (2013.01); *F16M 2200/028* (2013.01); *F21Y 2115/10* (2016.08)

(58) Field of Classification Search

CPC ... A47F 3/001; A47F 11/10; F21W 2131/405; F21W 2131/305; F21W 2131/301; F21W 2121/00; F25D 27/00; F21V 33/0012; F21V 15/01

USPC ................................................. 362/125–126

See application file for complete search history.

(56) References Cited

U.S. PATENT DOCUMENTS

| | | | |
|---|---|---|---|
| 4,502,103 | A | 2/1985 | Collins |
| 4,736,279 | A | 4/1988 | Yamai |

(Continued)

OTHER PUBLICATIONS

Invitation to Pay Additional Fees and, Where Applicable, Protest Fee in Application No. PCT/US2017/056193, dated Dec. 7, 2017, 2 pages.

(Continued)

*Primary Examiner* — William Carter

(74) *Attorney, Agent, or Firm* — Fish & Richardson P.C.

(57) ABSTRACT

This document provides product display systems for displaying merchandise. Exemplary product display systems disclosed herein include a base, a first side wall and a second side wall each slidably coupled to the base, a first support plate and a second support plate, a pusher mechanism, a front plate positioned at the front of the base, a first hanger bracket and a second hanger bracket each slidably coupled to the base, and a front bracket unit connected to the first and second hanger brackets. Some embodiments of product display systems disclosed herein include a lighting unit, e.g., having a LED lighting source. This document also provides selectively detachable lighting housings that can be attached to product display systems.

8 Claims, 20 Drawing Sheets

(51) Int. Cl.

| | |
|---|---|
| ***F21V 17/10*** | (2006.01) |
| ***F21V 21/088*** | (2006.01) |
| *F21Y 115/10* | (2016.01) |

(56) References Cited

U.S. PATENT DOCUMENTS

| | | | | |
|---|---|---|---|---|
| 5,012,936 | A | 5/1991 | Crum | |
| 5,190,186 | A | 3/1993 | Yablans et al. | |
| 5,366,099 | A | 11/1994 | Schmid | |
| 5,390,802 | A | 2/1995 | Pappagallo et al. | |
| 5,542,552 | A | 8/1996 | Yablans et al. | |
| 5,605,237 | A | 2/1997 | Richardson et al. | |
| 5,665,304 | A | 9/1997 | Heinen et al. | |
| 5,690,415 | A * | 11/1997 | Krehl | A47F 5/101 362/125 |
| 5,791,487 | A | 8/1998 | Dixon | |
| 5,839,588 | A | 11/1998 | Hawkinson | |
| 5,855,283 | A | 1/1999 | Johnson | |
| 5,894,933 | A | 4/1999 | Crews et al. | |
| 5,924,790 | A | 7/1999 | Ponton | |
| D445,615 | S | 7/2001 | Burke | |
| 6,325,523 | B1 * | 12/2001 | Santosuosso | A47F 3/001 362/125 |
| 6,351,964 | B1 | 3/2002 | Brancheau et al. | |
| 6,375,015 | B1 | 4/2002 | Wingate | |
| 6,382,431 | B1 | 5/2002 | Burke | |
| 6,430,467 | B1 | 8/2002 | D Amelio et al. | |
| 6,443,317 | B1 | 9/2002 | Brozak | |
| 6,484,891 | B2 | 11/2002 | Burke | |
| 6,561,617 | B2 | 5/2003 | Silverbrook | |
| 6,622,874 | B1 | 9/2003 | Hawkinson | |
| 6,671,578 | B1 | 12/2003 | D Amelio et al. | |
| 6,749,207 | B2 | 6/2004 | Nadeau | |
| 6,772,888 | B2 | 8/2004 | Burke | |
| 6,886,699 | B2 | 5/2005 | Johnson et al. | |
| 7,066,342 | B2 | 6/2006 | Baechle et al. | |
| 7,111,735 | B2 | 9/2006 | Lowry | |
| 7,137,517 | B2 | 11/2006 | Lowry et al. | |
| 7,175,034 | B2 | 2/2007 | Nook et al. | |
| 7,419,062 | B2 | 9/2008 | Mason | |
| 7,681,744 | B2 | 3/2010 | Johnson | |
| 7,703,614 | B2 | 4/2010 | Schneider et al. | |
| 7,758,233 | B2 | 7/2010 | Chang | |
| 7,794,132 | B2 | 9/2010 | Cunius | |
| 7,823,734 | B2 | 11/2010 | Hardy | |
| 7,854,334 | B2 | 12/2010 | Nagel et al. | |
| 8,066,398 | B2 | 11/2011 | Hartman | |
| 8,118,164 | B2 | 2/2012 | Brown | |
| 8,142,047 | B2 | 3/2012 | Acampora | |
| 8,210,367 | B2 | 7/2012 | Nagel et al. | |
| 8,292,095 | B2 | 10/2012 | Howlett | |
| 8,413,826 | B2 | 4/2013 | Schneider et al. | |
| 8,419,205 | B1 | 4/2013 | Schmuckle | |
| 8,453,851 | B2 | 6/2013 | Ciesick | |
| 8,506,109 | B2 | 8/2013 | Stukenberg et al. | |
| 8,631,956 | B2 | 1/2014 | Dowd | |
| 8,651,296 | B2 | 2/2014 | Beaty | |
| 8,720,702 | B2 | 5/2014 | Nagel | |
| 8,800,811 | B2 | 8/2014 | Sherretts et al. | |
| 8,814,399 | B2 | 8/2014 | Osawa | |
| 8,820,545 | B2 | 9/2014 | Kologe | |
| 8,925,745 | B2 | 1/2015 | Theisen et al. | |
| 8,978,903 | B2 | 3/2015 | Hardy | |
| 8,978,904 | B2 | 3/2015 | Hardy | |
| 8,998,005 | B2 | 4/2015 | Hardy | |
| 9,016,484 | B2 | 4/2015 | Kologe | |
| 9,038,833 | B2 | 5/2015 | Ciesick | |
| 9,044,089 | B1 | 6/2015 | Sandhu | |
| 9,072,394 | B2 | 7/2015 | Hardy | |
| 9,091,587 | B2 | 7/2015 | Kawamura et al. | |
| 9,101,230 | B2 | 8/2015 | Sosso et al. | |
| 9,107,515 | B2 | 8/2015 | Hardy | |
| 9,131,787 | B2 | 9/2015 | Berglund et al. | |
| 9,138,075 | B2 | 9/2015 | Hardy et al. | |
| 9,138,076 | B2 | 9/2015 | Hardy | |
| 9,149,132 | B2 | 10/2015 | Hardy | |
| 9,179,788 | B2 | 11/2015 | Hardy | |
| 9,185,999 | B2 | 11/2015 | Hardy | |
| 9,254,049 | B2 | 2/2016 | Nagel | |
| 2010/0195317 | A1 * | 8/2010 | Oketani | A47F 3/001 362/125 |
| 2011/0204009 | A1 * | 8/2011 | Karan | A47F 1/12 362/125 |
| 2014/0305889 | A1 | 10/2014 | Vogler et al. | |

OTHER PUBLICATIONS

'grocery.dcim.com' [online]. "SpaceGrid I Trays—Enhance Frozen Food Appeal and Profitability," Feb. 22, 2016 [retrieved on Jul. 14, 2017]. Retrieved from the Internet: URL https://grocery.dcim.com/Products/SpaceGrid-1.aspx. 3 pages.

'grocery.dcim.com' [online]. "SpaceGrid II Trays—Maximize Profitability in Key Store Perimeter Categories," Feb. 22, 2016 [retrieved on Jul. 14, 2017]. Retrieved from the Internet: URL https://grocery.dcim.com/Products/SpaceGrid-II.aspx. 2 pages.

'phoenixdisplays.com' [online]. "Phoenix Displays LLC—Manufacturer of Forward-Facing Product Displays," Oct. 9, 2014 [retrieved on Jul. 14, 2017]. Retrieved from the Internet: URL http://www.phoenixdisplays.com/displays.html#Fixed. 3 pages.

'www.triononline.com' [online]. "Trion—Wonderbar Merchandising System," Sep. 2, 2014 [retrieved on Jul. 14, 2017]. Retrieved from the Internet: URL http://www.triononline.com/product/wonderbar-merchandising-system/. 2 pages.

International Search Report and Written Opinion in International Application No. PCT/US2017/056193, dated Feb. 6, 2018, 14 pages.

* cited by examiner

PRODUCT DISPLAY SYSTEMS

CROSS-REFERENCE TO RELATED APPLICATIONS

This application claims priority to U.S. Provisional Application Ser. No. 62/507,547, filed on May 17, 2017, and to U.S. Provisional Application Ser. No. 62/408,465 filed on Oct. 14, 2016, the entire contents of each of which are hereby incorporated by reference.

TECHNICAL FIELD

This document relates to product display systems for displaying merchandise.

BACKGROUND

Product display systems are used by retailers for displaying a variety of products to consumers. A variety of different product display systems are used by retailers, including gravity-fed and pusher-type display systems. Traditionally, product display systems have been designed such that only one size of product can be displayed, requiring retailers to use a number of different product display systems to accommodate products having different dimensions. Moreover, product display systems having pusher mechanisms have traditionally been designed such that the pusher mechanism utilizes a static pushing force, requiring retailers to use a number of different product display systems to accommodate products having different weights or other physical properties that affect the force required to push them forward. Conventional product display systems that utilize pusher mechanisms are difficult to load with product due to the constant forward force applied by the pusher mechanism. Thus, there is a need for product display systems that address these and other issues. It would also be beneficial for a product display systems to be visually appealing to draw consumers' attention to the products that are displayed.

SUMMARY

This document provides product display systems for displaying merchandise. In some cases, product display systems disclosed herein can be used to display products to consumers. For example, products displayed on product display systems disclosed herein can include, refrigerated or frozen food items such as without limitation, meat products, dairy products, produce (e.g., organic produce), pre-packaged salad mixes, and other food items. In some cases, product display systems disclosed herein can be used to display non-food items to consumers.

In one aspect, this document features a product display system comprising: (a) a base having an upper surface, a lower surface, and defining a first axis, (b) a first side wall and a second side wall each slidably coupled to the base, (c) a first support plate and a second support plate, each having an upper surface and a lower surface, (d) a pusher mechanism, (e) a front plate positioned at the front of the base, (f) a first hanger bracket and a second hanger bracket each slidably coupled to the base, and (g) a front bracket unit connected to the first and second hanger brackets. The first and second side walls can each have a wall portion that extends away from the upper surface of the base, and a lower portion comprising a lower surface that is at least partially positioned on top of the upper surface of the base, such that the lower portions of the first and second side walls are slidable over the upper surface of the base along an axis perpendicular to the first axis. The first and second support plates can be connected to the base. The pusher mechanism can include a pusher paddle and a spring, such that said pusher paddle is moveable relative to the base along the first axis. The first and second hanger brackets can be positioned on opposing lateral sides of said base. The first and second hanger brackets can be attachable to a support bar such that said product display system is supported in a substantially horizontal configuration. The base can be slidable along the first axis relative to the first and second hanger brackets. The first side wall can be slidable over said first hanger bracket, and said second side wall can be slidable over said second hanger bracket. The front bracket can include an extension tab releasably coupleable with the base for detaining the base in an extended position relative to the first and second hanger brackets.

The base can include a locking mechanism and the front bracket unit can include a locking tab, such that when the locking mechanism engages the locking tab, the base does not move relative to the front bracket unit along the first axis.

The front plate can be detachably connected to the upper surface of the base. The front plate can include a first channel for holding a label. The front plate can further include a second channel. The front plate can be detachably connected to a height extender.

The pusher paddle can be detachably connected to the first support plate, the second support plate, or both. The pusher paddle can include one or more paddle flanges that engage the first support plate, the second support plate, or both. The spring can be releasably connected to the front bracket unit. The spring can be releasably connected to the front bracket unit by a pin. The spring can be a spiral tension spring.

The first and second side walls can be releasably connected to the base. The first and second side walls can be independently slidable over the top surface of the base. The first side wall, said second side wall, or both, can include one or more lateral position markings, wherein the one or more lateral position markings denote an extent to which the first side wall, the second side wall, or both, are slidably extended away from the base along an axis perpendicular to the first axis. The lower portions of the first and second side walls can be at least partially positioned between the top surface of the base and the lower surfaces of the first and second support plates. The first side wall can include a first slide tab and the base can further include a first slide tab catch that engages the first slide tab, wherein the first slide tab catch comprises one or more first slide tab catch nodes for detaining the first side wall in one or more detent positions. The second side wall can include a second slide tab and the base further can include a second slide tab catch that engages the second slide tab, wherein the second slide tab catch comprises one or more second slide tab catch nodes for detaining the second side wall in one or more detent positions.

The product display system can further include a lighting housing coupled to the front bracket, and a lighting unit. The lighting unit can include a lighting source, a wire for conducting power to the lighting source, a lighting unit side tab, and a lighting unit release tab. The lighting housing can further include: (a) a lighting unit release tab catch for engaging the lighting unit release tab; and (b) a lighting unit side tab catch for engaging the lighting unit side tab. The lighting source can be a LED. The LED can emit yellow or white light. The LED can be removable from the lighting unit. At least one of the first or second hanger brackets can include a wire catch, an excess wire retainer, or both, for holding the wire. The product display system can further include a power bar having one or more power inlets for accepting power, and one or more power outlets for supplying power to the lighting unit. The power bar can be magnetic such that it can be magnetically attached to a support surface.

The first and second hanger brackets can include a plurality of vertical attachment units such that said product display system can be supported in one of a plurality of vertical positions. The vertical attachment units can be substantially hook-shaped.

The base can further include an extension tab catch such that when the extension tab catch engages the extension tab of the front bracket unit, the base is prevented from moving along the first axis relative to the front bracket unit.

The upper surface of the first support plate, the upper surface of the second support plate, or both, can have ridges aligned along the first axis. The first and second support plates can be detachably connected to the base.

In another aspect, this document features a selectively detachable lighting housing comprising a product display attachment portion. The product display attachment portion of a selectively detachable lighting housing can include one or more elongated tabs. The one or more elongated tabs can be releasably insertable into one or more elongated apertures present on a product display system. The product display attachment portion of a selectively detachable lighting housing can include one or more elongated apertures. The one or more elongated apertures can be releasably engagable by one or more elongated tabs present on a product display system. The product display attachment portion of a selectively detachable lighting housing can include one or more peg holes. The one or more peg holes can be releasably engagable by one or more pegs present on a product display system. The one or more peg holes can be releasably engagable by one or more screws inserted from or through a product display system. The one or more peg holes can be releasably engagable by one or more bolts inserted from or through a product display system.

Unless otherwise defined or explained, all technical and scientific terms used herein have the same meaning as commonly understood by one of ordinary skill in the art to which this disclosure belongs. Methods and materials are described herein for use in the present disclosure; other, suitable methods and materials known in the art can also be used. All publications, patent applications, patents, database entries, and other references mentioned herein are incorporated by reference in their entirety. In case of conflict, the present specification, including definitions, will control.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1A shows a top perspective view of an exemplary product display system. FIG. 1B shows a front view of an exemplary product display system with side walls positioned for minimum width. FIG. 1C shows a front view of an exemplary product display system with side walls extended.

FIG. 2A shows a top view. FIG. 2B shows a side view. FIG. 2C shows a bottom view. FIG. 2D shows a front view. FIG. 2E shows a rear view.

FIG. 4A shows a bottom perspective view of a retracted exemplary product display system. FIG. 4B shows an exploded partial bottom perspective view of an exemplary product display system. FIG. 4C shows a bottom perspective view of an extended exemplary product display system. FIG. 4D shows a partial bottom perspective view of a locking mechanism of an exemplary product display system.

DETAILED DESCRIPTION

This document provides product display systems for displaying merchandise. In some cases, product display systems disclosed herein can be used to display products to consumers. For example, products displayed on product display systems disclosed herein can include, refrigerated or frozen food items such as without limitation, meat products, dairy products, produce (e.g., organic produce), pre-packaged salad mixes, and other food items. In some cases, product display systems disclosed herein can be used to display non-food items to consumers.

In one aspect, this document features a product display system comprising: (a) a base having an upper surface, a lower surface, and defining a first axis, (b) a first side wall and a second side wall each slidably coupled to the base, (c) a first support plate and a second support plate, each having an upper surface and a lower surface, (d) a pusher mechanism, (e) a front plate positioned at the front of the base, (f) a first hanger bracket and a second hanger bracket each slidably coupled to the base, and (g) a front bracket unit connected to the first and second hanger brackets. The first and second side walls can each have a wall portion that extends away from the upper surface of the base, and a lower portion comprising a lower surface that is at least partially positioned on top of the upper surface of the base, such that the lower portions of the first and second side walls are slidable over the upper surface of the base along an axis perpendicular to the first axis. The first and second support plates can be connected to the base. The pusher mechanism can include a pusher paddle and a spring, such that said pusher paddle is moveable relative to the base along the first axis. The first and second hanger brackets can be positioned on opposing lateral sides of said base. The first and second hanger brackets can be attachable to a support bar such that said product display system is supported in a substantially horizontal configuration. The base can be slidable along the first axis relative to the first and second hanger brackets. The first side wall can be slidable over said first hanger bracket, and said second side wall can be slidable over said second hanger bracket. The front bracket can include an extension tab releasably coupleable with the base for detaining the base in an extended position relative to the first and second hanger brackets. The spring can be releasably connected to the front bracket unit.

Figure 1A:
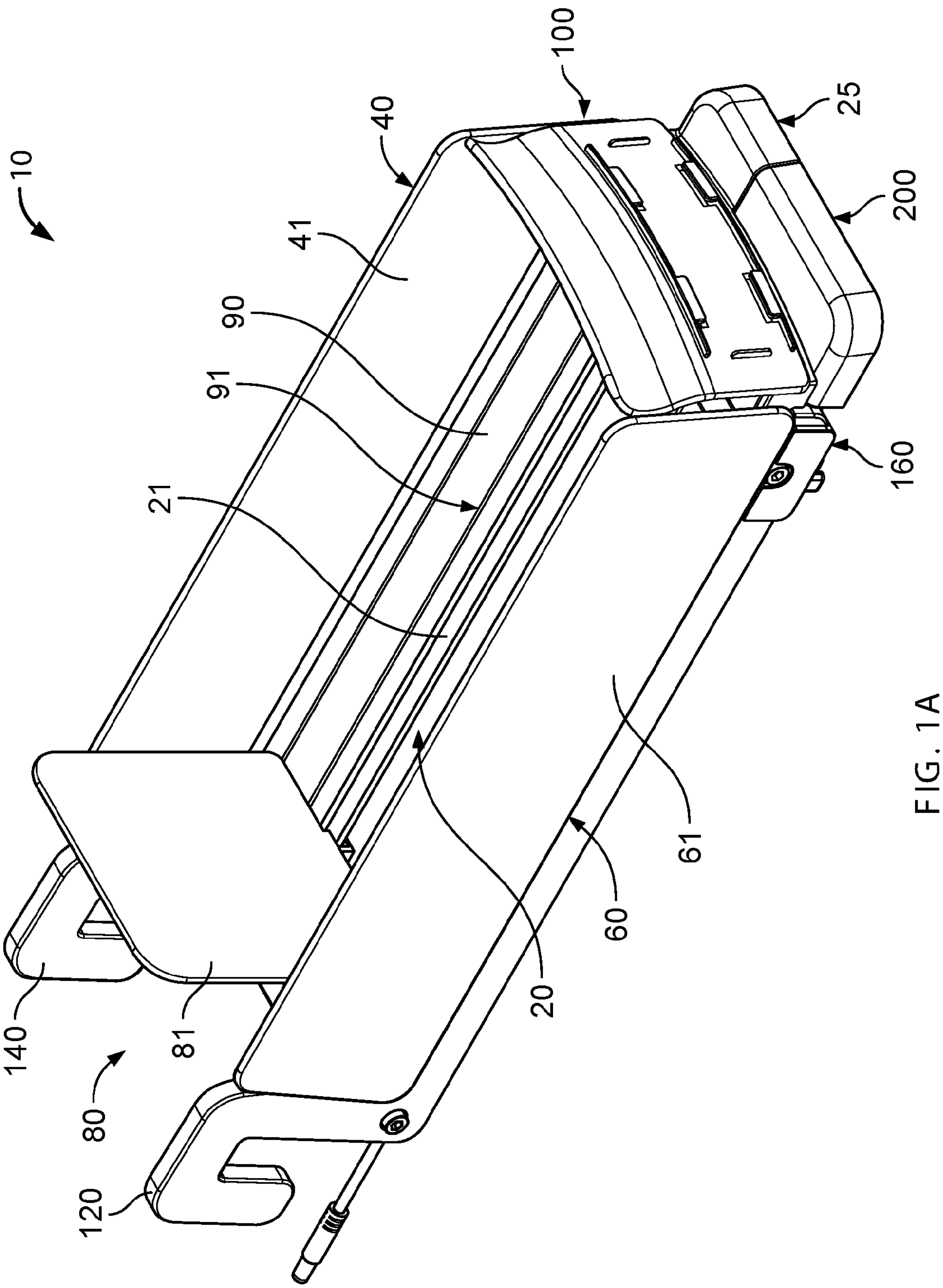
FIGS. 1A-C show a series of views of an exemplary product display system.

Referring to the drawings, there is shown in FIG. 1 series of views of an exemplary product display system 10. FIG. 1A shows a top perspective view of an exemplary product display system 10. Laterally extendible side walls 40 and 60 are positioned on each side of a base 20. Each side wall includes a wall portion 41 and 61 that extends away from the base 20. The base 20 has an upper surface 21, on top of which are positioned a first support plate and a second support plate 90. In the embodiment shown in FIG. 1A, support plate 90 includes ridges 91. Such ridges permit products to slide on top of the support plates with reduced friction. A first hanger bracket 120 and a second hanger bracket 140 are slidably coupled to the base 20. The exemplary product display system 10 show in FIG. 1A includes a pusher mechanism 80 having a pusher paddle 81 that is moveable relative the base 20 along a first axis. A front plate 100 is positioned at the front of the base 20. The base 20 includes a locking mechanism 25. The exemplary product display system 10 show in FIG. 1A includes a front bracket unit 160. The front bracket unit 160 includes a lighting housing 200.

Figure 1B:
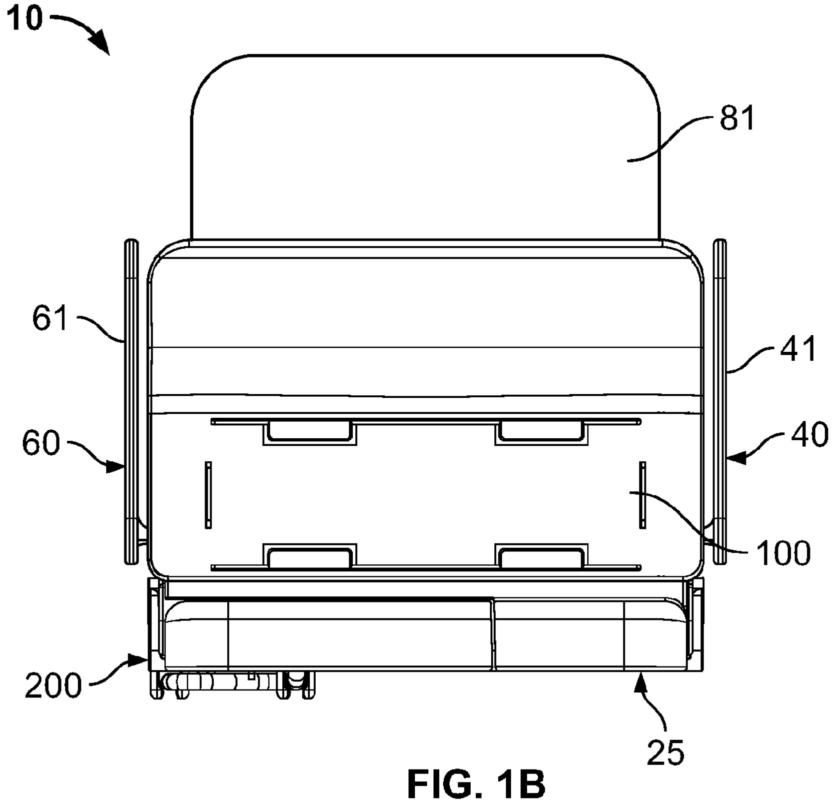

FIG. 1B shows a front view of the exemplary product display system 10 with wall portions 41 and 61 of side walls 40 and 60 positioned for minimum width.

Figure 1C:
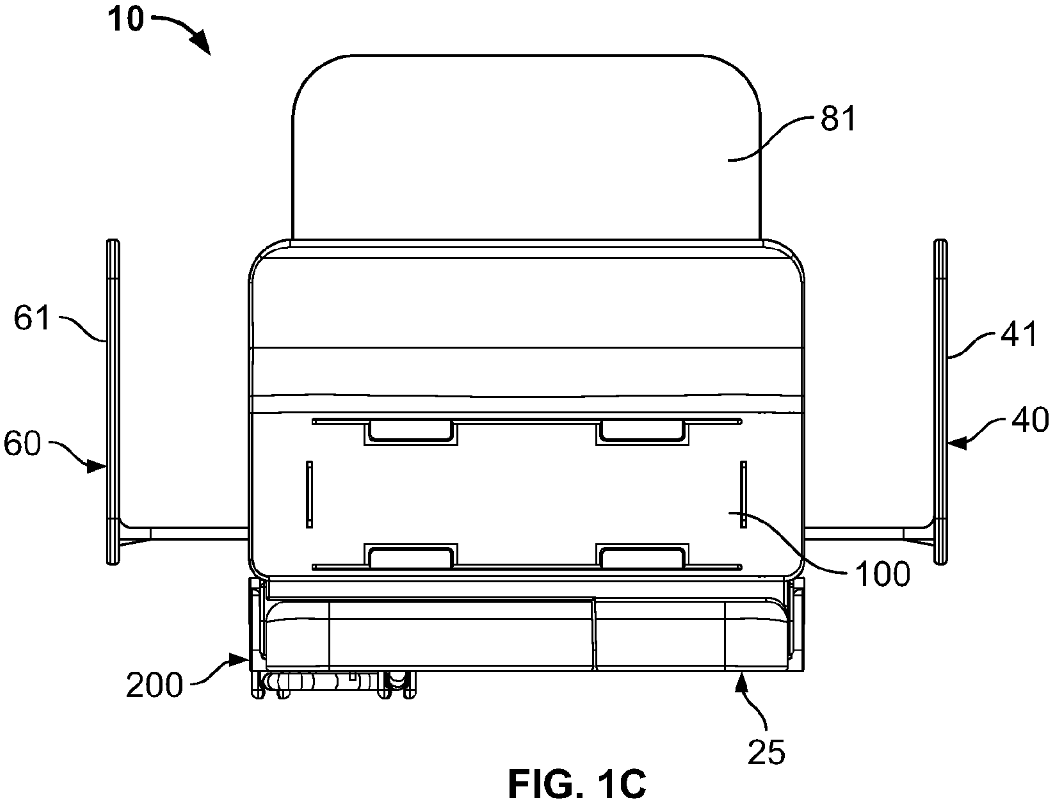

FIG. 1C shows a front view of the exemplary product display system 10 with wall portions 41 and 61 of side walls 40 and 60 laterally extended.

Figure 2A:
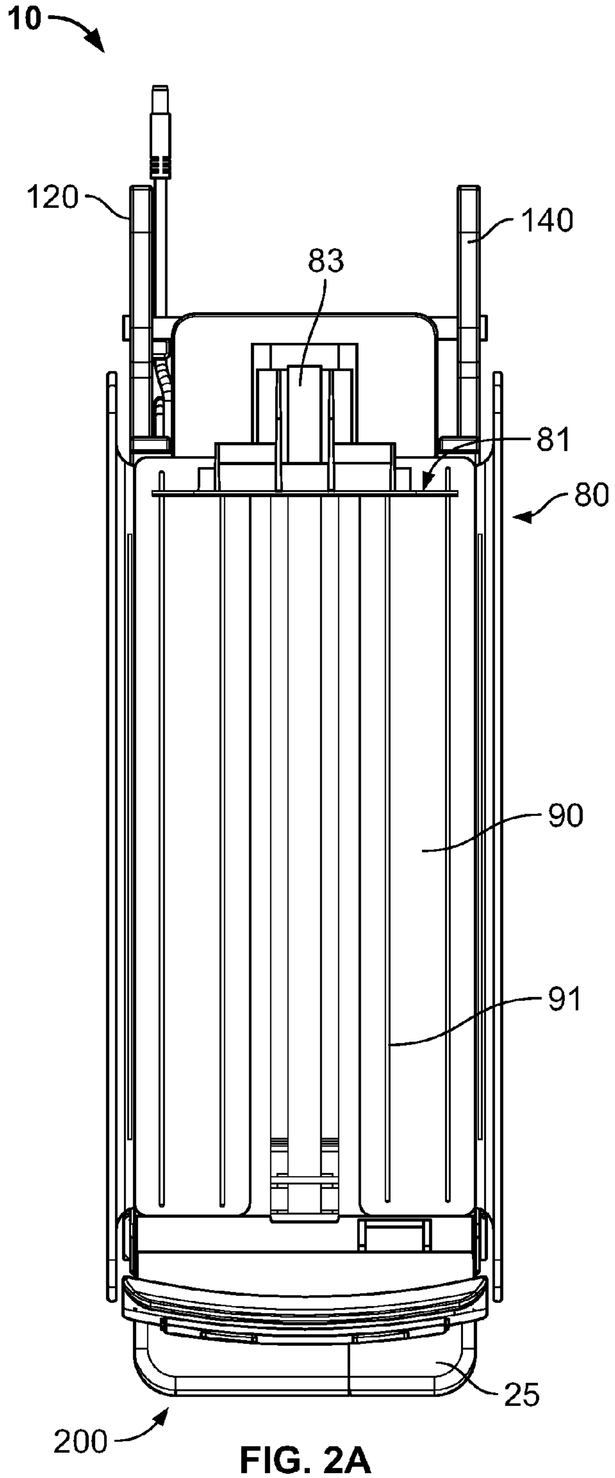
FIGS. 2A-E show a series of views of an exemplary product display system.

FIGS. 2A-E show a series of views exemplary product display system 10. FIG. 2A shows a top view. In this view, spring 83 of the pusher mechanism 80 is shown. Spring 83 applies forward force to the pusher paddle 81, biasing the pusher mechanism 80 to move towards the front plate 100.

Figure 2B:
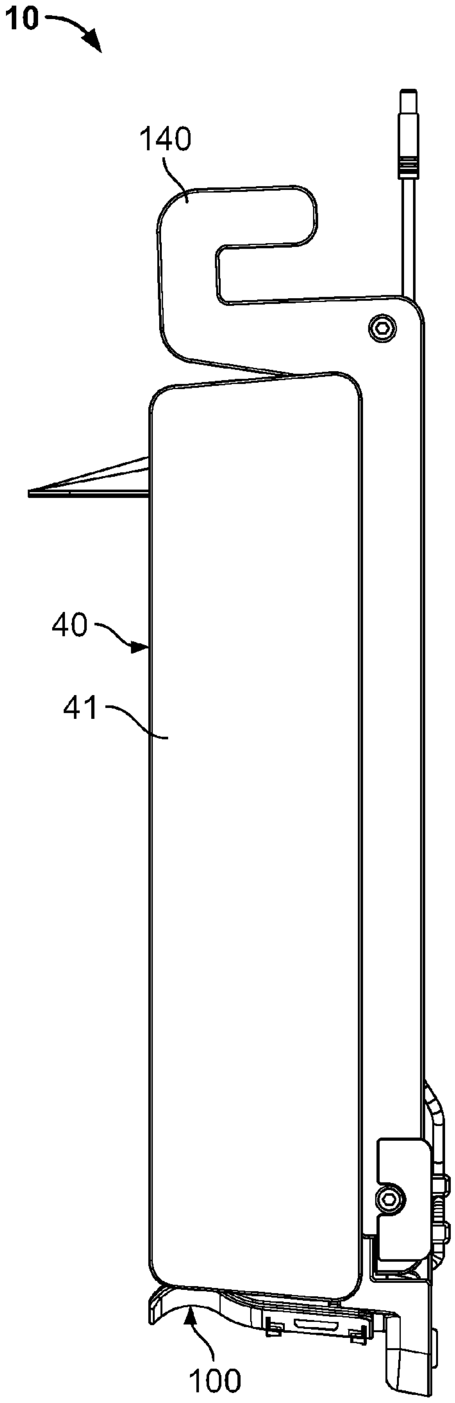

FIG. 2B shows a side view of exemplary product display system 10. In this view, wall portion 41 of side wall 40 is shown. Front plate 100 is shown with an exemplary curved face.

Figure 2C:
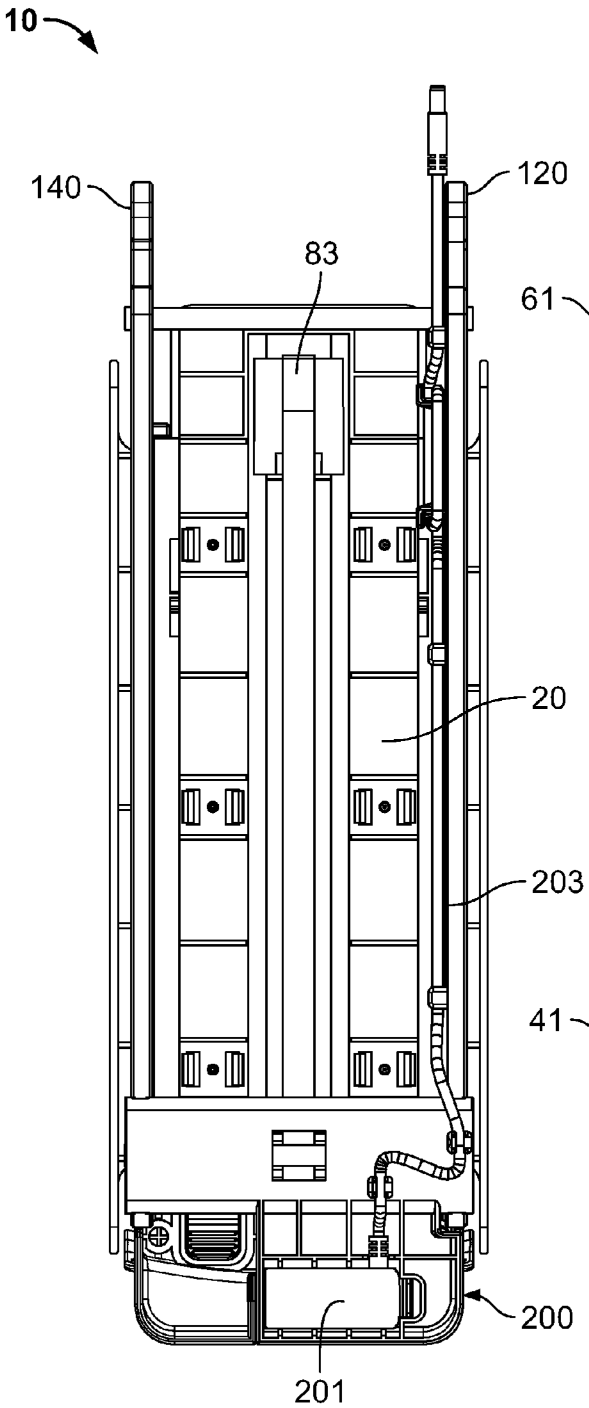

FIG. 2C shows a bottom view of exemplary product display system 10. In this view, lighting housing 200 is shown engaging a lighting unit 201. Wire 203 for lighting unit 201 runs along hanger bracket 120.

Figure 2D:
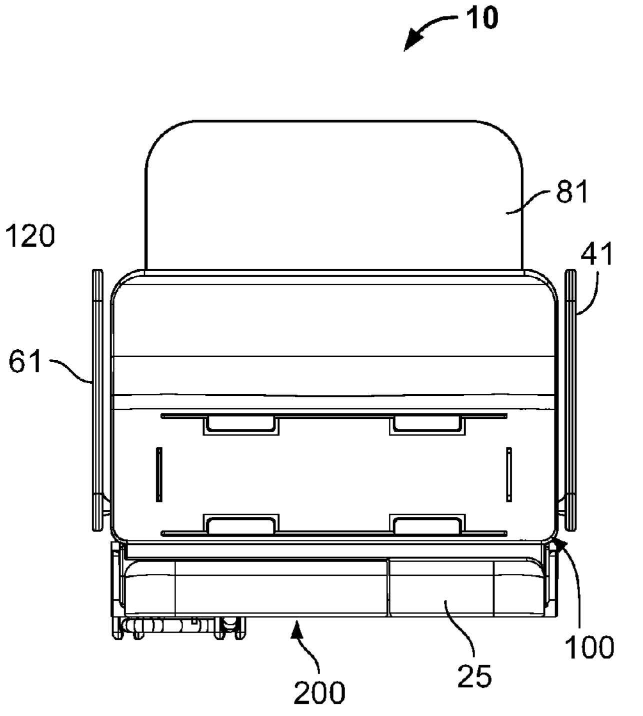

FIG. 2D shows a front view of exemplary product display system 10. In this view, pusher paddle 81 is seen positioned behind front plate 100. Wall portions 41 and 61 of side walls 40 and 60 are positioned for minimum width.

Figure 2E:
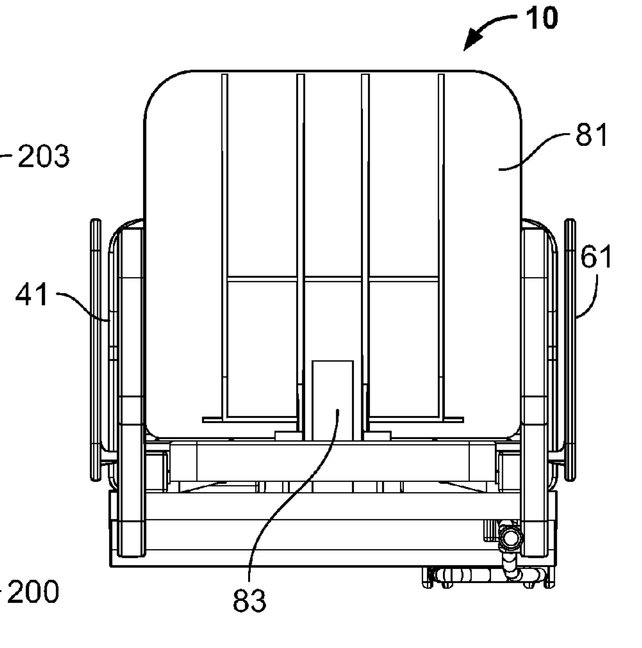

FIG. 2E shows a rear view of exemplary product display system 10. In this view, a portion of spring 83 is shown positioned behind and applying force to pusher paddle 81.

Figure 3:
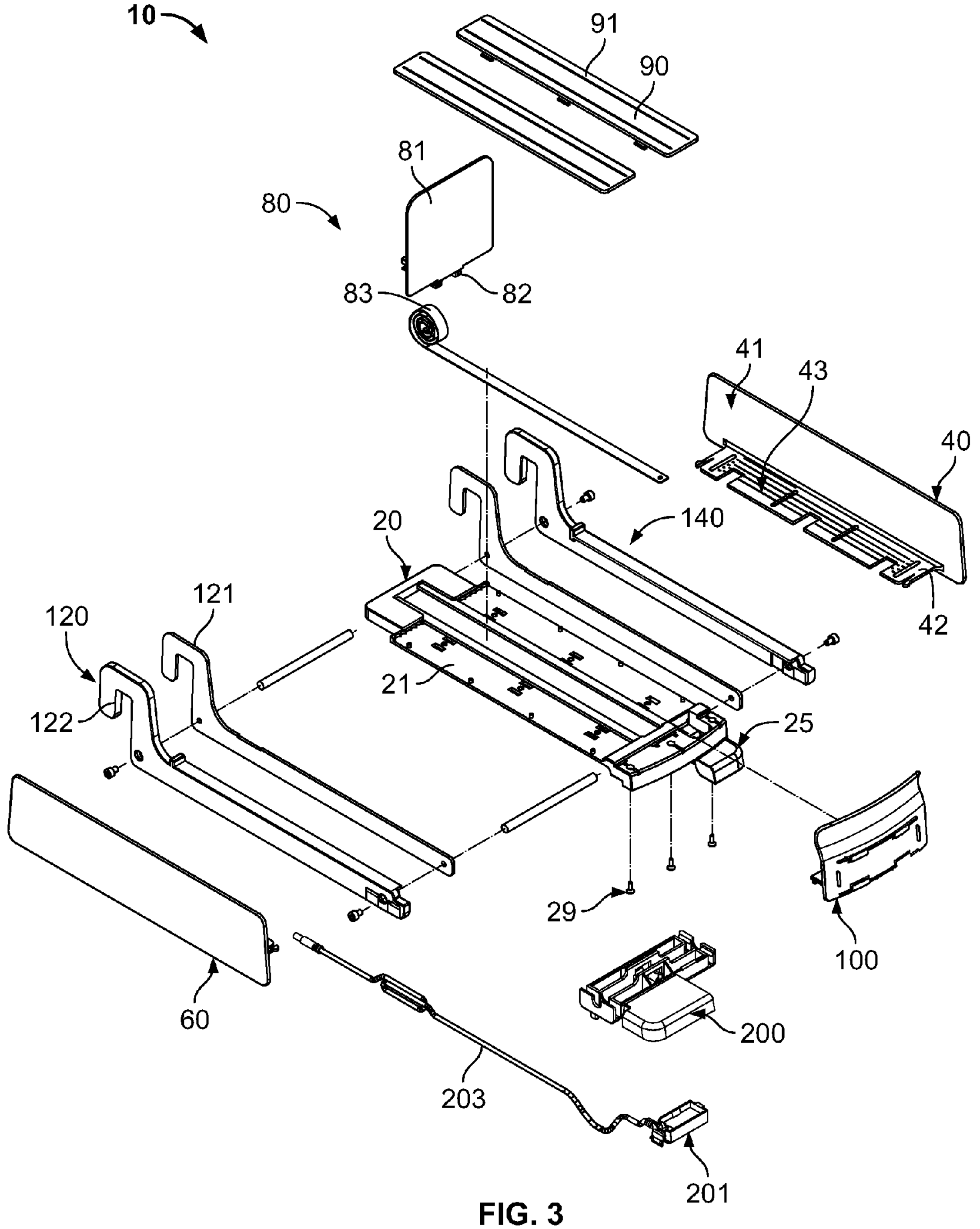
FIG. 3 shows an exploded top perspective view of an exemplary product display system.

FIG. 3 shows an exploded top perspective view of exemplary product display system 10. Removable front plate 100 with an exemplary curved face is shown as detachably connected to base 20 via screws 29. Lighting housing 200 is shown with removable lighting unit 201 detached. First and second side walls 40 and 60 are shown. First side wall 40 is shown with wall portion 40 and lower portion 42. Lower portion 42 is shown with lateral position markings 43. First and second hanger brackets 120 and 140 are shown. An exemplary embodiment of first hanger bracket 120 is shown with a steel insert 121 and a molded plastic arm 122. Pusher mechanism 80 is shown, including pusher paddle 81 and spring 83. Pusher paddle 81 is shown with paddle flanges 82 for engaging support plate 90. One of a pair of support plates 90 is shown with ridges 91, the support plates being positionable on top surface 21 of base 20.

Figure 4A:
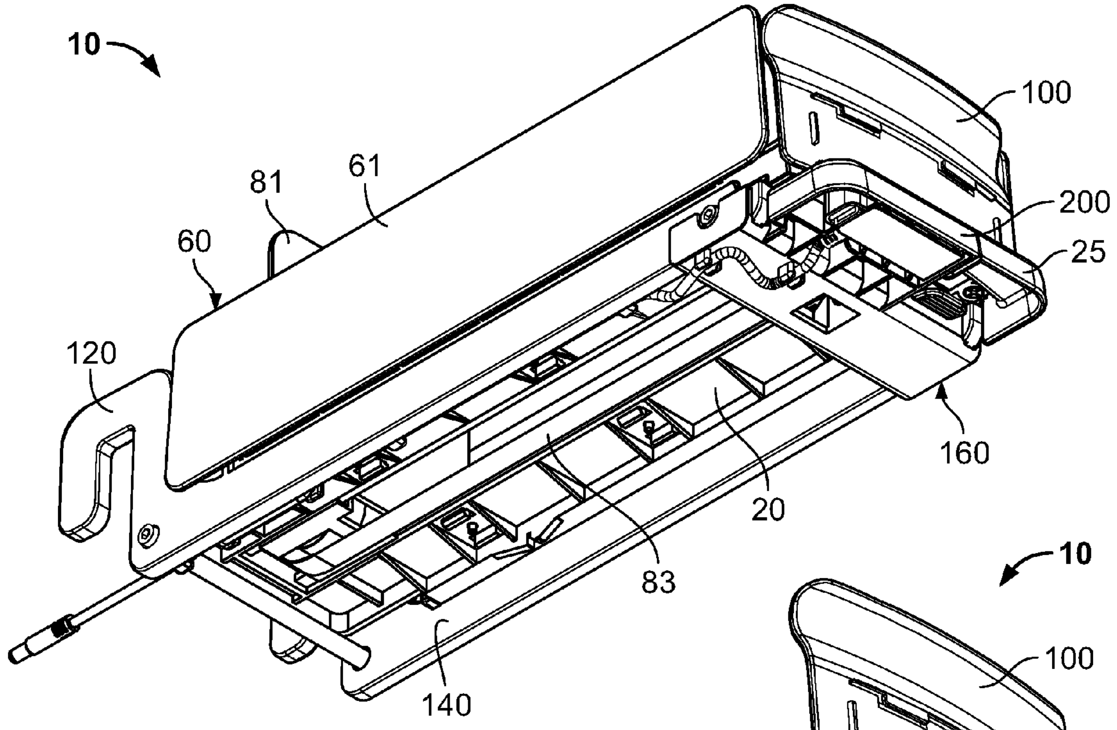
FIGS. 4A-D show a series of bottom perspective views of an exemplary product display system.

FIGS. 4A-D show a series of bottom perspective views of exemplary product display system 10. FIG. 4A shows a bottom perspective view of retracted exemplary product display system 10. In this view, base 20 is retracted relative to first and second hanger brackets 120 and 140. Front plate 100 is positioned close to front bracket unit 160.

Figure 4B:
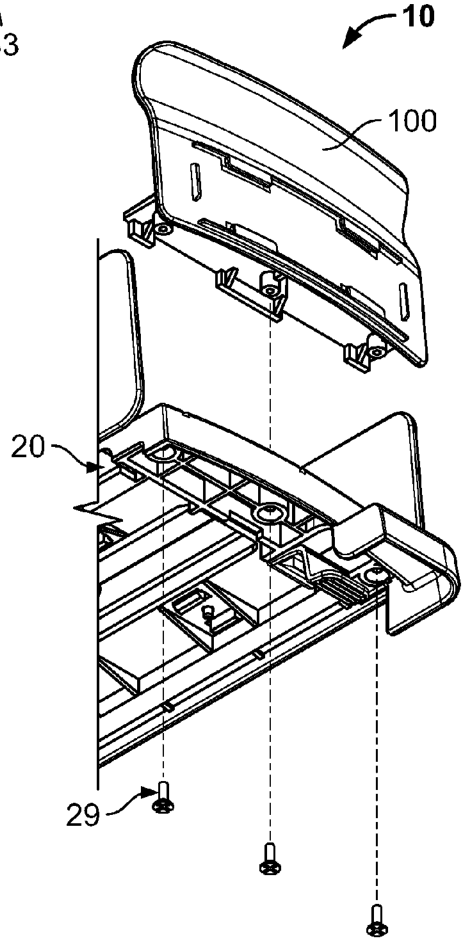

FIG. 4B shows an exploded partial bottom perspective view of exemplary product display system 10. In this view, removable front plate 100 with an exemplary curved face is shown as detachably connected to base 20 via screws 29.

Figures 4C, 4D:
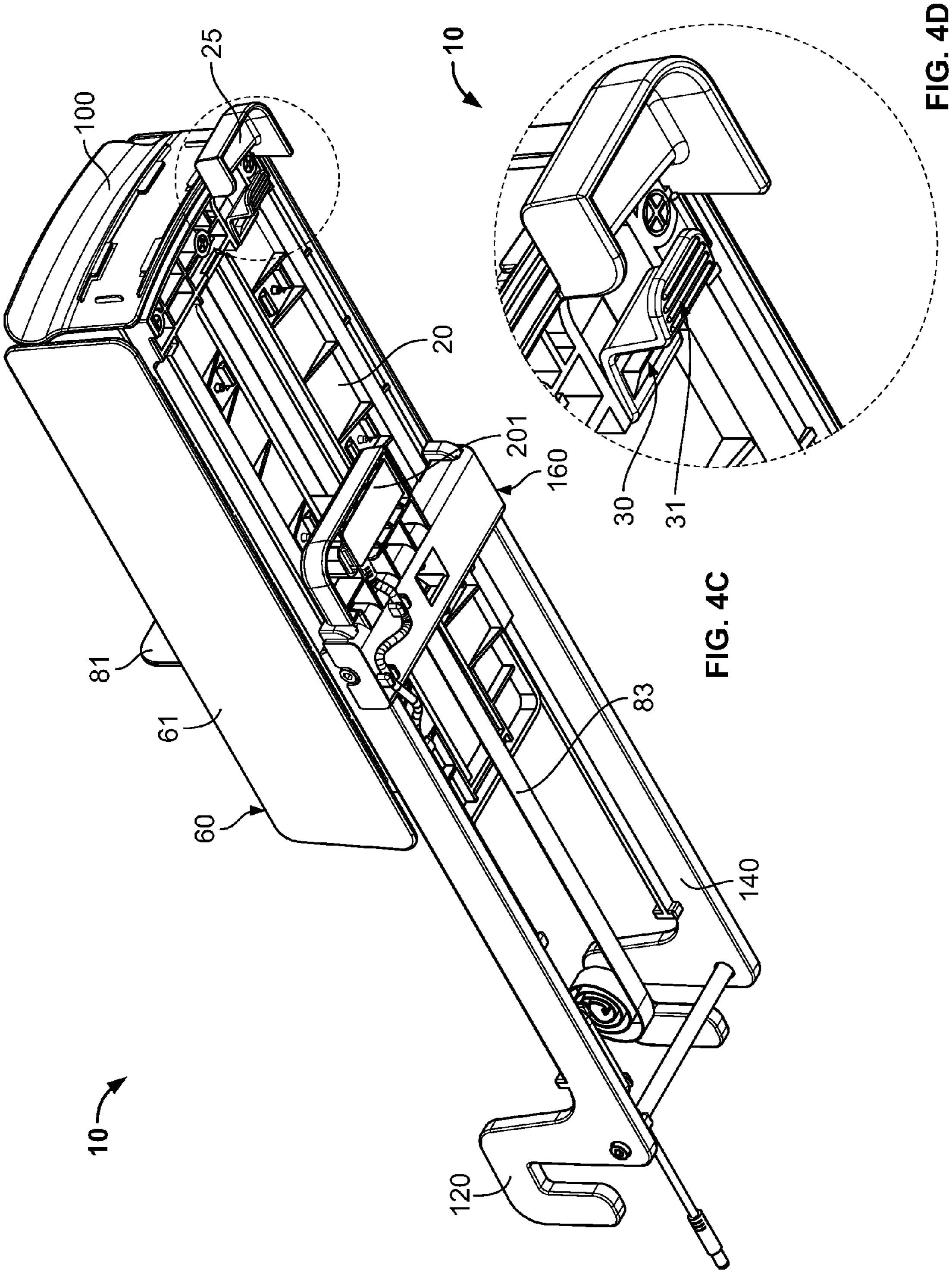

FIG. 4C shows a bottom perspective view of extended exemplary product display system 10. In this view, base 20 is extended relative to first and second hanger brackets 120 and 140. Front plate 100 is extended away from front bracket unit 160. The area indicated by the dotted circle is shown in more detail in FIG. 4D.

FIG. 4D shows a partial bottom perspective view of a locking mechanism of exemplary product display system 10. A push-to-release tab 31 detaches auto lock latch 30 from the front bracket unit (not shown).

Figure 5A:
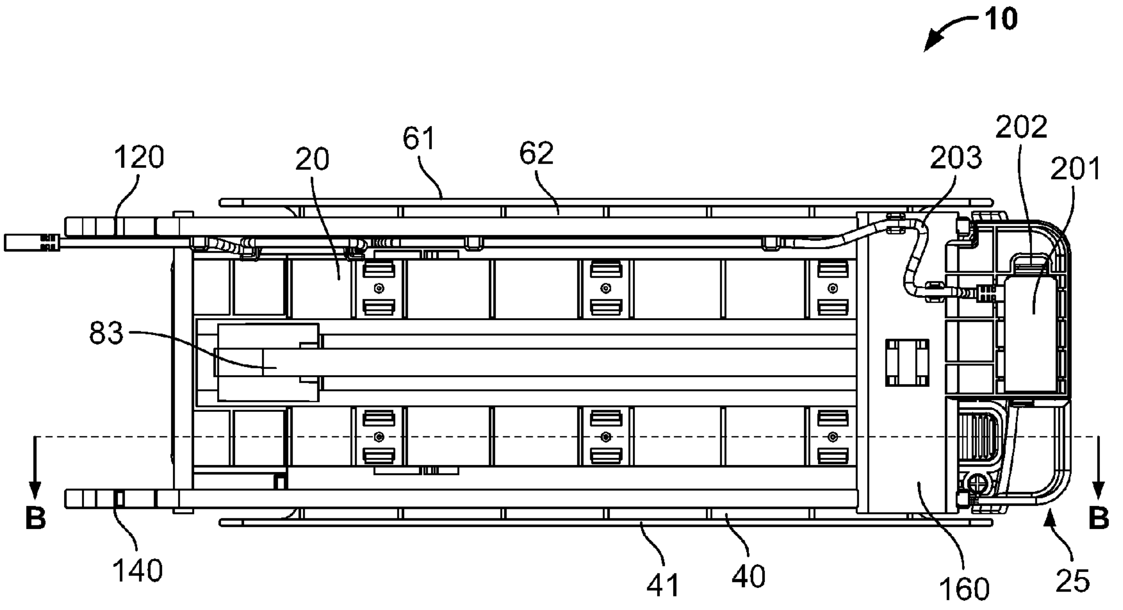
FIG. 5A shows a bottom view of an exemplary product display system.

FIG. 5A shows a bottom view of exemplary product display system 10. Line B-B indicates the plane of section views shown in FIGS. 5B and 5C. Locking mechanism 25 and front bracket unit 160 are shown.

Figure 5B:
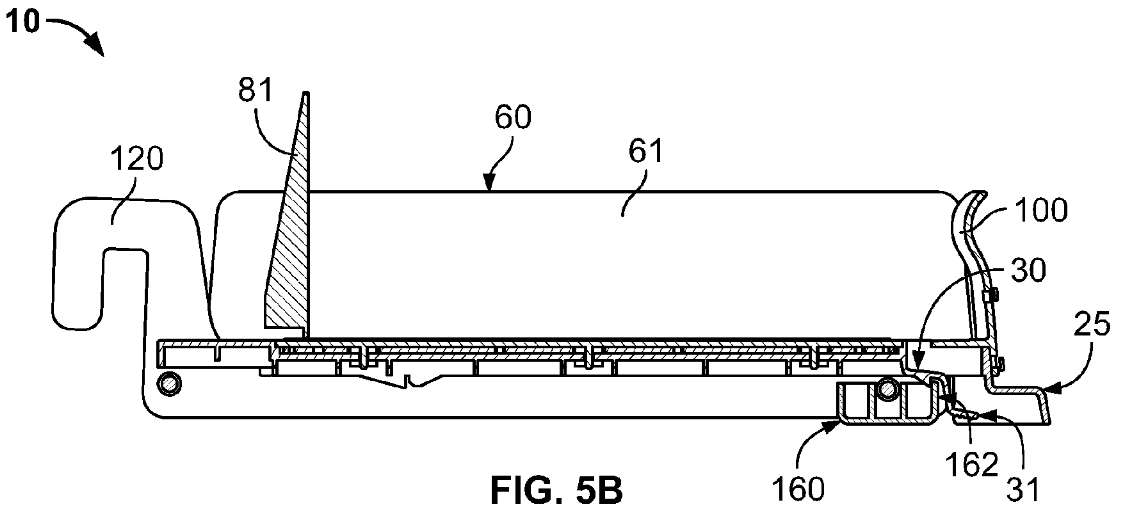
FIG. 5B shows a section view along line B-B of FIG. 5A of a fully retracted exemplary product display system.

FIG. 5B shows a section view along line B-B of FIG. 5A of fully retracted exemplary product display system 10. Locking mechanism 25 is shown with auto lock latch 30 engaging locking tab 162 of front bracket unit 160. In this configuration, the product display system is held in a retracted position.

Figure 5C:
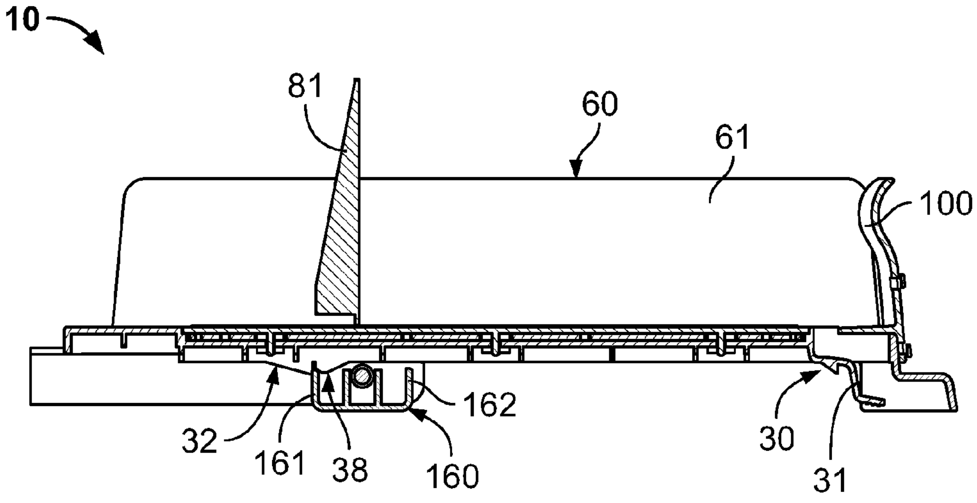
FIG. 5C shows a section view along line B-B of FIG. 5A of a fully extended exemplary product display system.

FIG. 5C shows a section view along line B-B of FIG. 5A of fully extended exemplary product display system 10. Locking mechanism 25 has been disengaged from locking tab 162 of front bracket unit 160 by pushing the push to release tab 31. In this position, extension tab catch 38 is engaged with extension tab 161, thus holding the product display system in a fully extended position. Stop tab 32 prevents the base from extending further.

Figure 6A:
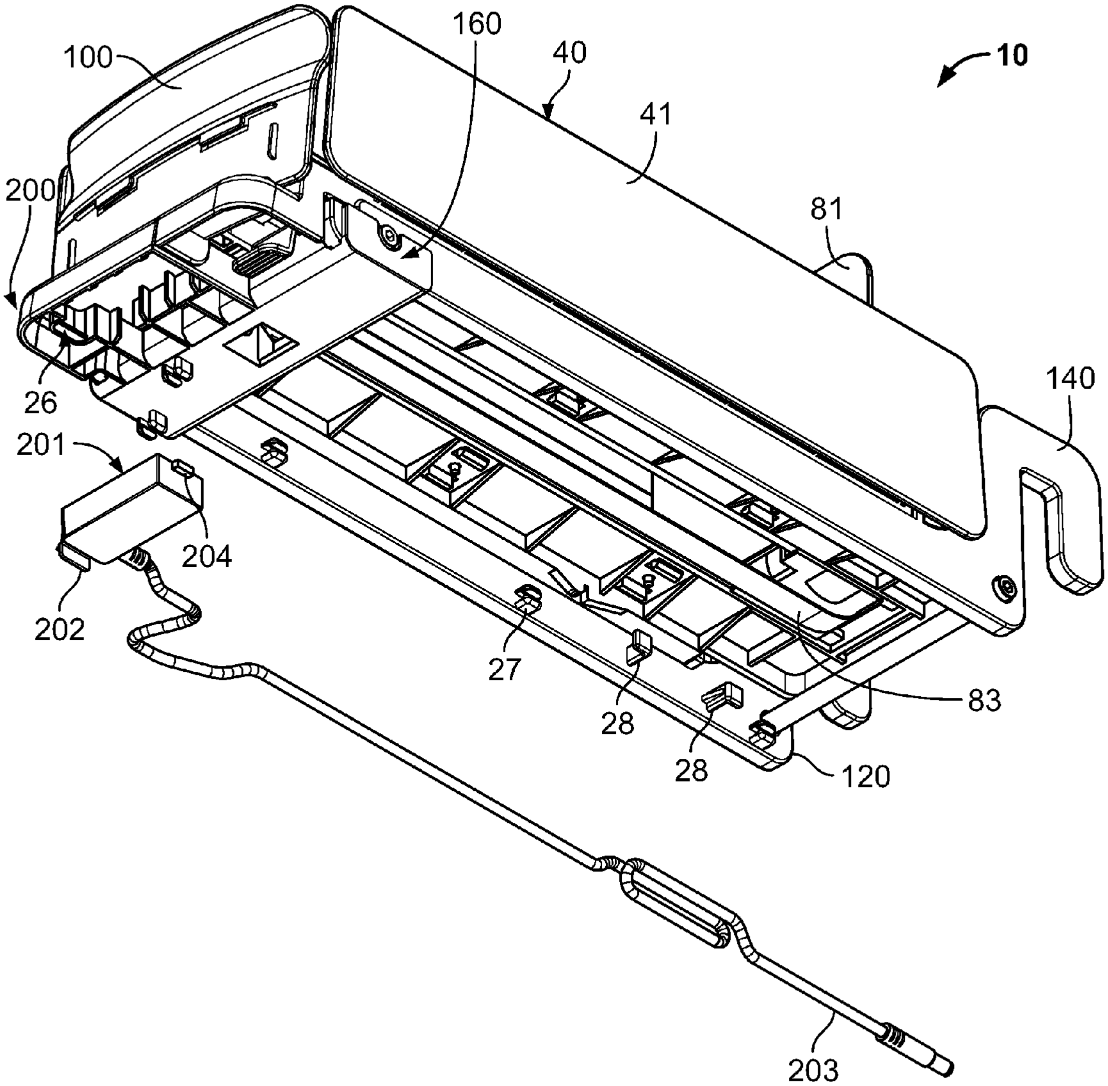
FIG. 6A shows a partially exploded bottom perspective view of an exemplary product display system with a lighting housing and a lighting unit.

FIG. 6A shows a partially exploded bottom perspective view of exemplary product display system 10 with a lighting housing 200 coupled to front bracket 160. Lighting unit 201 is shown removed from lighting housing 200. In the exemplary embodiment shown, lighting unit release tab 202 and lighting unit side tab 204 are shown attached to lighting unit 201. Lighting unit release tab 202 engages lighting unit release tab catch 26 on lighting housing 200. Wire 203 provides power to lighting unit 201. Hanger bracket 120 includes wire catch 27 and excess wire retainers 28 for holding excess wire 203.

Figure 6B:
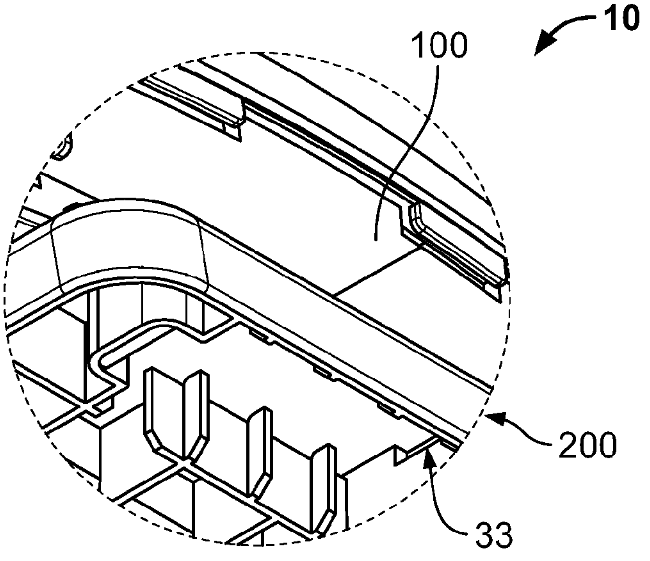
FIG. 6B shows a reverse isometric view of the front part of the bottom perspective view show in FIG. 6A.

FIG. 6B shows a reverse isometric view of the front part of the bottom perspective view show in FIG. 6A. In this view, lighting housing 200 is shown having lighting unit side tab catch 33 for engaging lighting unit side tab.

Figure 7:
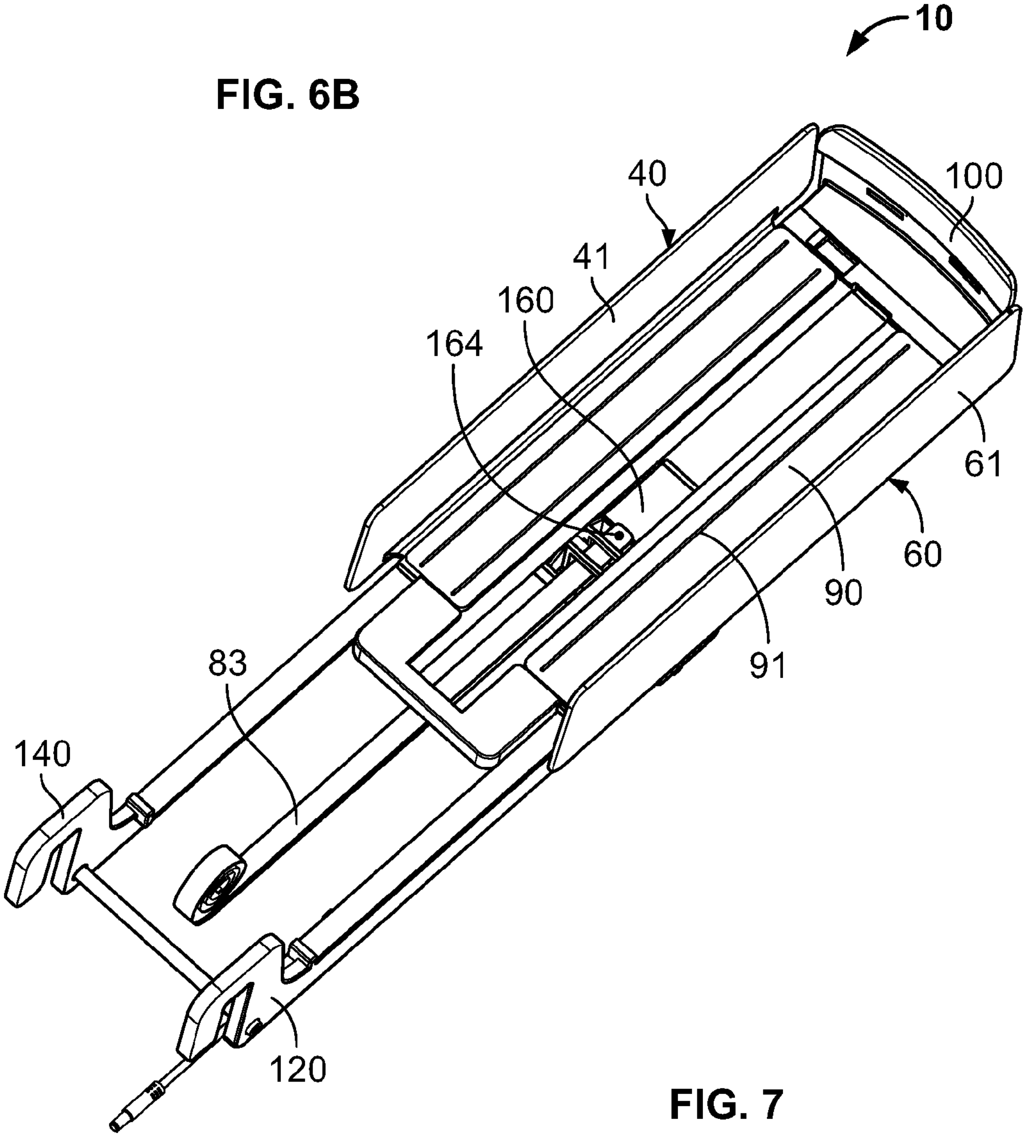
FIG. 7 shows a top perspective view of an exemplary product display system in an extended position with the pusher paddle removed for clarity.

FIG. 7 shows a top perspective view of exemplary product display system 10 in an extended position with the pusher paddle removed for clarity. In the embodiment shown in this view, spring 83 is releasably connected to the front bracket unit 160 by a pin 164.

Figure 8B:
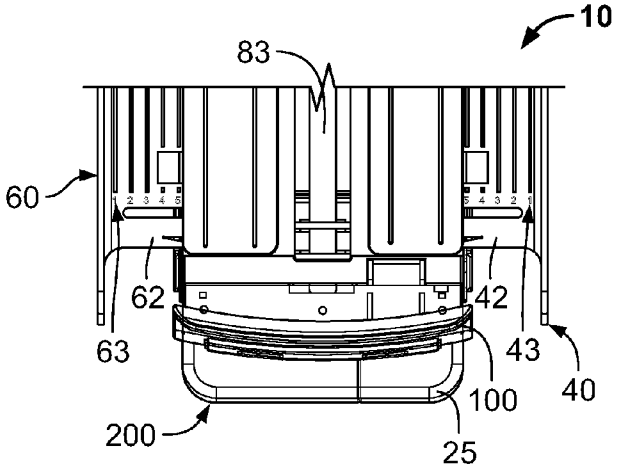
FIG. 8B shows a partial top view of an exemplary product display system with extended side walls having lateral position markings.
Figure 8A:
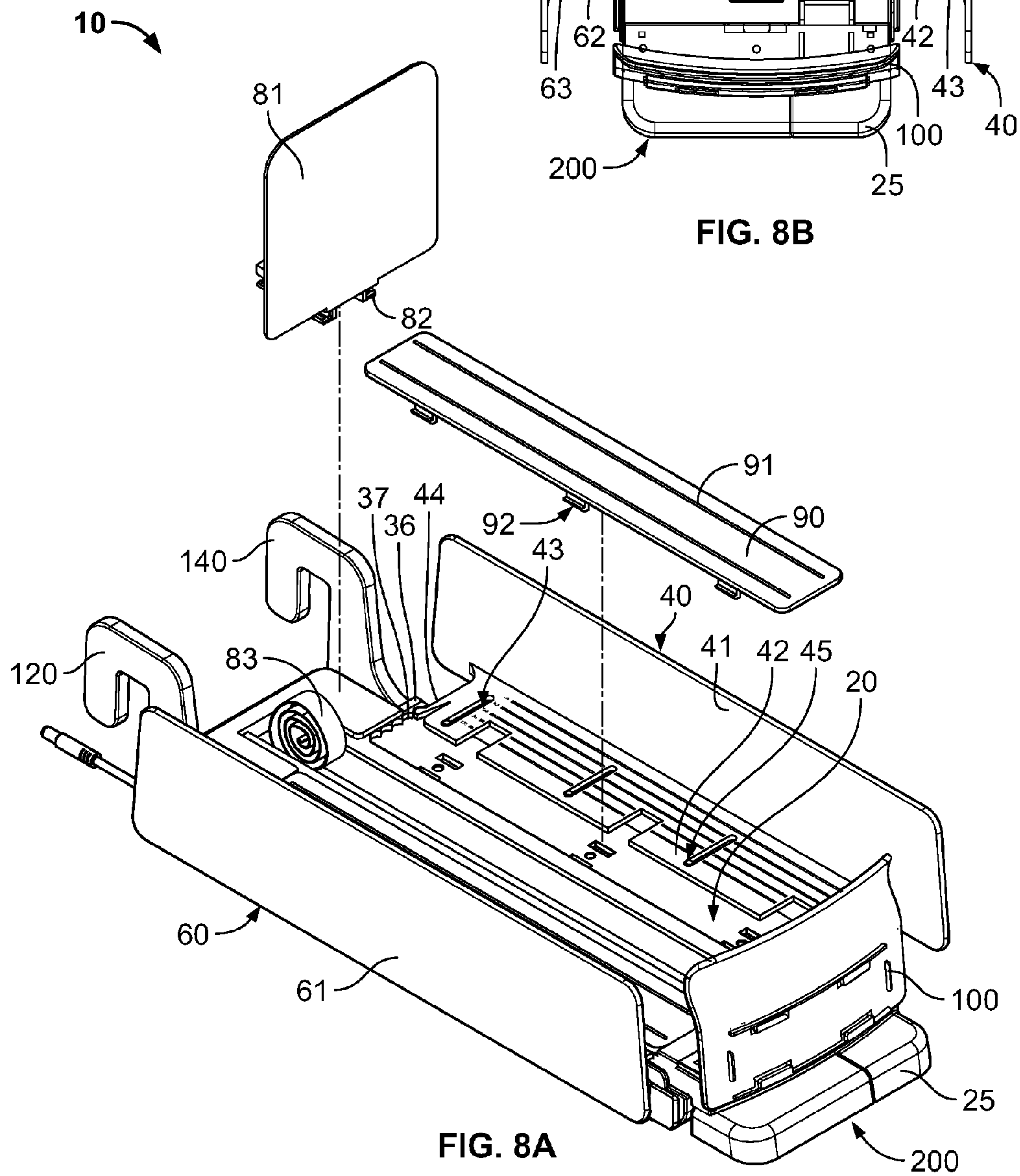
FIG. 8A shows a partially exploded top perspective view of an exemplary product display system with extended side walls having lateral position markings.

FIG. 8A shows a partially exploded top perspective view of exemplary product display system 10 with extended side wall 40 having lateral position markings 43 on the lower portion 42. In the embodiment shown, lateral position markings 43 are labeled 1 through 5. Retainer pins 45 are shown connecting lower portion 42 of side wall 40 to base 20 and limiting lateral extension therefrom. Support plate 90 with ridges 91 is shown with several support plate attachment flanges 92 for detachably attaching support plate 90 to base 20. The lower portion 42 of side wall 40 is shown having first slide tab 44 engaged with first slide tab catch node 37 or first slide tab catch 36 on base 20. Pusher paddle 81 is shown with paddle flanges 82 for engaging support plate 90.

FIG. 8B shows a partial top perspective view of exemplary product display system 10 with extended side walls 40 and 60 having lateral position markings 43 and 63 on lower portions 42 and 62. In the embodiment shown, lateral position markings 43 and 63 are labeled 1 through 5.

Figure 9A:
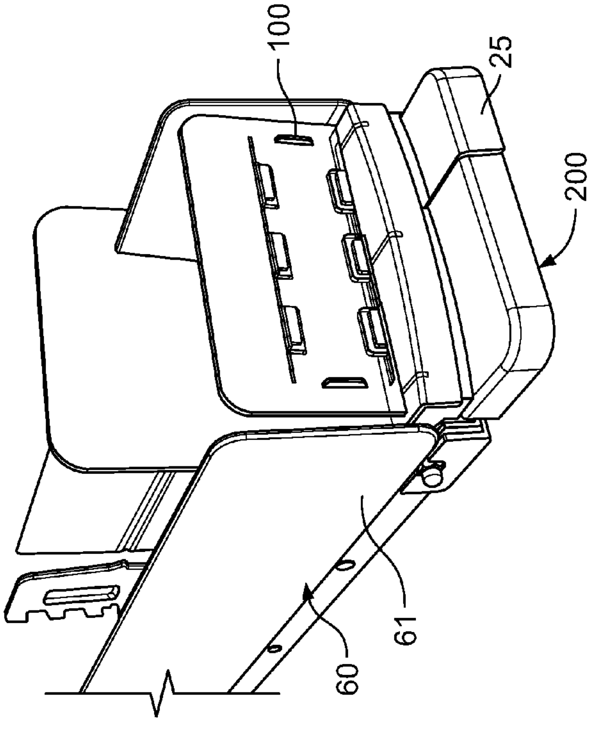
FIG. 9A shows a front perspective view of an exemplary product display system with a flat front plate.

FIG. 9A shows a front perspective view of an exemplary product display system with a flat front plate 100.

Figure 9B:
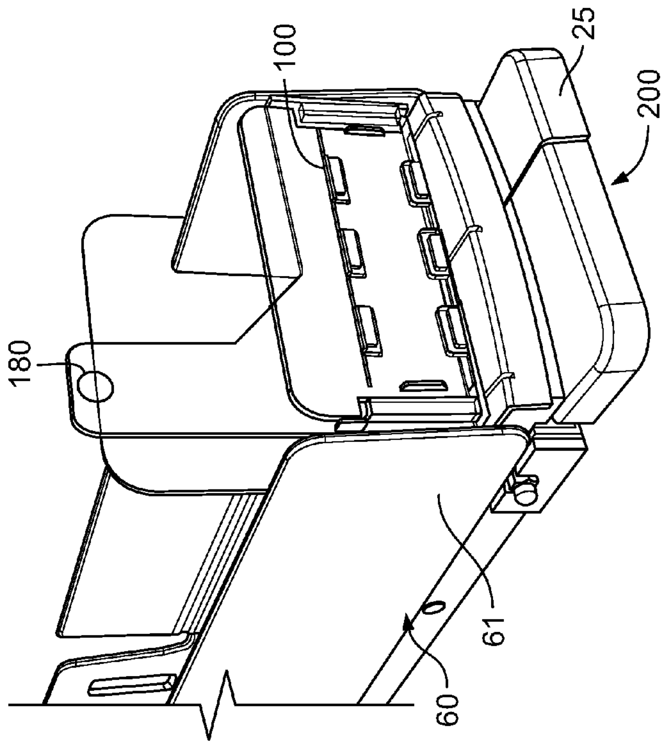
FIG. 9B shows a partial front perspective view of an exemplary product display system with a height extender attached to the front plate.

FIG. 9B shows a partial front perspective view of an exemplary product display system with a height extender 180 attached to flat front plate 100.

Figure 10:
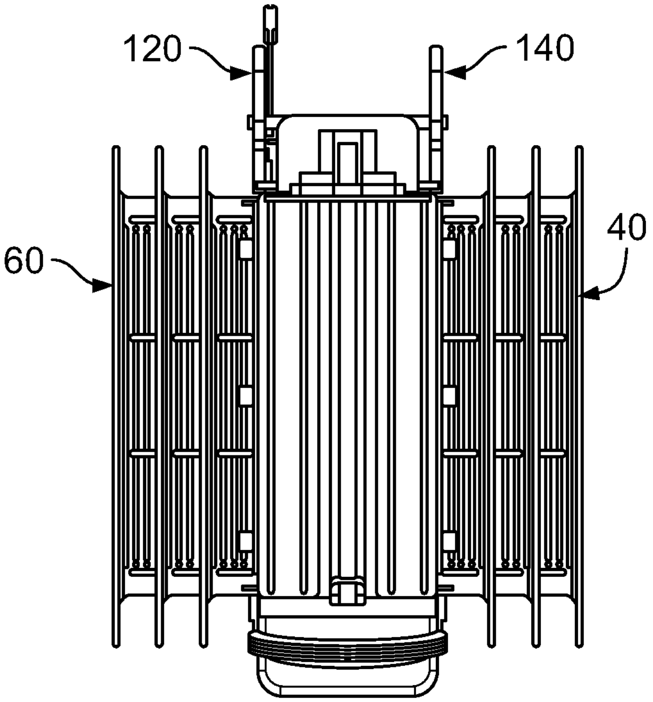
FIG. 10 shows a top view of an exemplary product display system with side walls in various extended positions

FIG. 10 shows a top view of an exemplary product display system with removable side walls 40 and 60 in various extended positions. Replaceable side walls 40 and 60 can be designed with varying widths to accommodate products having different widths.

Figure 11:
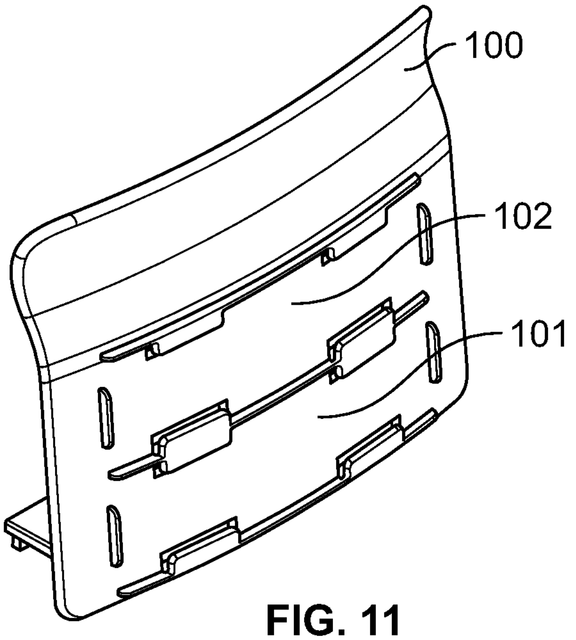
FIG. 11 shows a front perspective view of an exemplary front plate with a first channel and a second channel.

FIG. 11 shows a front perspective view of an exemplary front plate 100 with a curved front having a first channel 101 and a second channel 102.

Figure 12A:
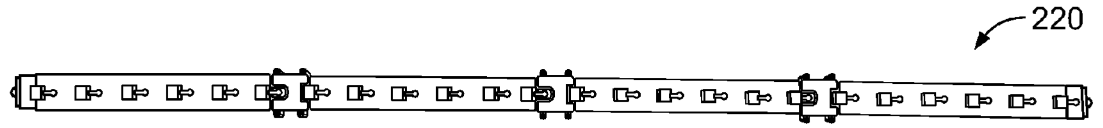
FIG. 12A shows a front view of an exemplary power bar.

FIG. 12A shows a front view of an exemplary power bar 220. Power bar 220 have any of a variety of lengths. In some cases, power bar 220 can have a length of about 20 inches, about 21 inches, about 22 inches, about 23 inches, about 24 inches, about 25 inches, about 26 inches, about 27 inches, about 28 inches, about 29 inches, about 30 inches, about 31 inches, about 32 inches, about 33 inches, about 34 inches, about 35 inches, about 36 inches, about 37 inches, about 38 inches, about 39 inches, about 40 inches, about 41 inches, about 42 inches, about 43 inches, about 44 inches, about 45 inches, about 46 inches, about 47 inches, about 48 inches, about 49 inches, about 50 inches, about 51 inches, about 52 inches, about 53 inches, about 54 inches, about 55 inches, about 56 inches, about 57 inches, about 58 inches, about 59 inches, about 60 inches, or more.

Figure 12B:
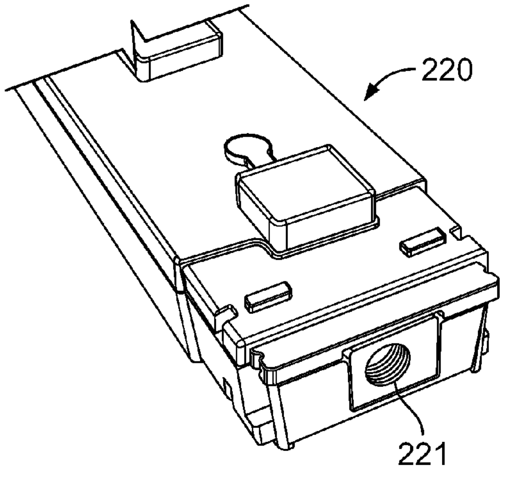
FIG. 12B shows a partial side perspective view of an exemplary power bar.

FIG. 12B shows a partial side view of an exemplary power bar 220 having a power inlet 221 for accepting power (e.g., from a standard power source). In some cases, a power bar 220 can have a single power inlet 221. In some cases, a power bar 220 can have multiple power inlets 221. For example, a power bar 220 can have 2, 3, 4, 5, 6, or more power inlets 221.

Figure 12C:
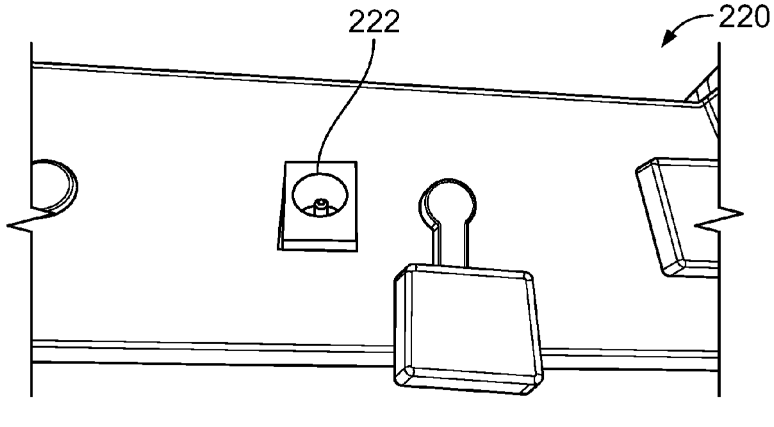
FIG. 12C shows a close-up front view of an exemplary power bar.

FIG. 12C shows a close-up front view of an exemplary power bar 220 having a power outlet 222 for providing power to a lighting unit of a product display system. In some cases, a power bar 220 can have a single power outlet 222. In some cases, a power bar 220 can have multiple power outlets 222. For example, a power bar 220 can have 2, 3, 4, 5, 6, 7, 8, 9, 10, 11, 12, 13, 14, 15, 16, 17, 18, 19, 20, 21, 22, 23, 24, 25, 26, 27, 28, 29, 30, or more power outlets 222. In some cases, a power outlet 222 of a power bar 220 is designed such that it is compatible with Hillphoenix®, Hussman®, or Kysor® manufactured cases that are pre-wired for LEDs. In some cases, a power bar 220 includes multiple different power outlets 222 that are compatible with multiple different cases that are pre-wired for LEDs.

Figure 13:
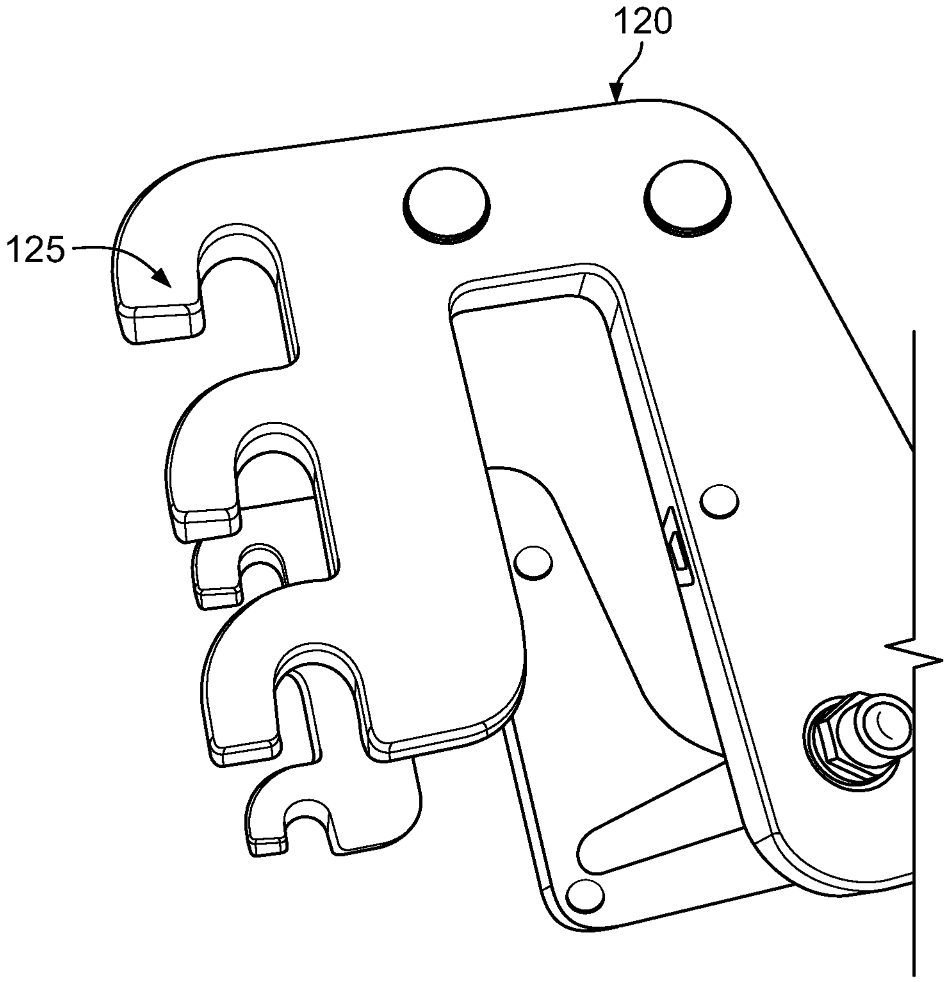
FIG. 13 shows a partial side view of an exemplary hanger bracket having vertical attachment units.

FIG. 13 shows a partial side view of an exemplary hanger bracket 120 having vertical attachment units 125. In the embodiment shown, the hanger bracket 120 includes three vertical attachment units 125 that are substantially hook-shaped. In some cases, a hanger bracket 120 can include 2, 3, 4, 5, 6, or more vertical attachment units 125. In some cases, the vertical attachment units 125 are spaced apart from each other evenly (e.g., by about 0.5 inches, about 1 inch, about 1.5 inches, about 2 inches, about 2.5 inches, about 3 inches, or more, or any space in between). In some cases, the vertical attachment units 125 are not spaced apart from each other evenly.

A product display system can have any of a variety of depths. In some cases, the depth of a product display system is selected to accommodate depth requirements of a display rack. As used herein, the phrase "display rack" means the physical structure into which a product display system is placed. In some cases, a display rack can accommodate two or more product display systems disclosed herein. In some cases, a display rack can accommodate two or more product display systems such that the product display systems are placed in a substantially horizontal configuration relative to each other. Additionally or alternatively, a display rack can accommodate two or more product display systems such that the product display systems are placed in a substantially vertical configuration relative to each other. For example, if a display rack can only accommodate a product display system having a depth of about 15 inches, the depth of a product display system can be selected to be about 15 or fewer inches. In some cases, a product display system can have a depth of about 10 inches, about 11 inches, about 12 inches, about 13 inches, about 14 inches, about 15 inches, about 16 inches, about 17 inches, about 18 inches, about 19 inches, about 20 inches, about 21 inches, about 22 inches, about 23 inches, about 24 inches, about 25 inches, about 26 inches, about 27 inches, about 28 inches, about 29 inches, about 30 inches, or more, or any depth in between. In some cases, a product display system can have a depth of fewer than about 10 inches.

In some cases, a product display system can be configured to be adjustable to any of a variety of widths to accept products of varying widths. In some cases, the first and second side walls are slidable perpendicularly relative to the first axis of the base to increase the width of the product display system. In some cases, the first and second side walls can be independently slidable. In some cases, first and second side walls are not independently slidable such that they slide perpendicularly relative to the first axis of the base together. In some cases, the first side wall, the second side wall, or both extend away from the base at about a right angle (e.g., about 90 degrees). In some cases, the first side wall, the second side wall, or both extend away from the base at an angle that is not a right angle (e.g., at an angle of less than about 75 degrees, at an angle of about 75 degrees, about 76 degrees, about 77 degrees, 78 degrees, about 79 degrees, about 80 degrees, about 81 degrees, about 82 degrees, about 83 degrees, 84 degrees, about 85 degrees, about 86 degrees, about 88 degrees, about 89 degrees, about 91 degrees, 92 degrees, about 93 degrees, about 94 degrees, about 95 degrees, about 96 degrees, about 97 degrees, 98 degrees, about 99 degrees, about 100 degrees, about 101 degrees, about 102 degrees, 103 degrees, about 104 degrees, about 105 degrees, or more).

In some cases, the first and second side walls can be removed from the product display system and replaced with different side walls (e.g., third and fourth side walls). For example, the first and second side walls having first and second widths, respectively (e.g., as defined by the lower portions of the first and second side walls) can be removed and replaced with third and fourth side walls having third and fourth widths, respectively. In some cases, the third side wall can have a width wider than the width of the first side wall and/or the fourth side wall can have a width wider than the width of the second side wall, such that when the first and second side walls are replaced with the third and fourth side walls, the product display system has a maximum width that is wider than maximum width of the product display system having first and second side walls.

In some cases, product display systems described herein having first and second slidable side walls can extend to a width of about 4 inches, about 4.5 inches, about 5 inches, about 5.5 inches, about 6 inches, about 6.5 inches, about 7 inches, about 7.5 inches, about 8 inches, about 8.5 inches, about 9 inches, about 9.5 inches, about 10 inches, about 10.5 inches, about 11 inches, about 11.5 inches, about 12 inches, about 12.5 inches, about 13 inches, about 13.5 inches, about 14 inches, about 14.5 inches, about 15 inches, or more, or any width in between. In some cases, the first side wall, the second side wall, or both, include lateral position markings for indicating the width to which the side wall(s) is extended.

In some cases, the first and second side walls are detachably connected to the base of a product display system. For example, the first and second side walls can be detachably connected to the base by one or more retainer pins 45, as exemplified in the embodiment shown in FIG. 8A. Such retainer pins permit the first and second side walls to extend away from the base perpendicularly to the first axis, but do not permit the side walls to detach completely from the base. In some cases, the lower portion of a side wall is sandwiched between a support plate and the upper surface of the base. In some cases, removing the support plate from the base exposes the lower portion of the side wall, which allows a side wall that is detachably connected to the base to be removed and replaced. In some cases, the first side wall can include a first slide tab and the base can further include a first slide tab catch that engages the first slide tab, wherein the first slide tab catch comprises one or more first slide tab catch nodes for detaining the first side wall in one or more detent positions. In some cases, the second side wall can include a second slide tab and the base further can include a second slide tab catch that engages the second slide tab, wherein the second slide tab catch comprises one or more second slide tab catch nodes for detaining the second side wall in one or more detent positions.

In some cases, a product display system disclosed herein can have a removable front plate, such that a different front plate can be attached to the product display system. Any of a variety of front plates are suitable for use with product display systems disclosed herein. For example, a front plate can have any of a variety of heights (e.g., to accommodate products having different heights). A front plate can have a height about 2 inches, about 2.5 inches, about 3 inches, about 3.5 inches, about 4 inches, about 4.5 inches, about 5 inches, or more, or any height in between. In some cases, a front plate is substantially flat (e.g., as in the embodiment shown in FIG. 9A). In some cases, a front plate is curved (e.g., as in the embodiment shown in FIG. 2B). In some cases, a front plate includes a readable label indicating information for the consumer (e.g., the type of product being displayed or the price). In some cases, a readable label is printed, embossed, engraved, or is otherwise permanently a part of the front plate itself. For example, in the case where the product display system is used to display organic food items (e.g., organic salad mixes), the word “organic” can be printed, embossed, engraved, or otherwise made permanently a part of the front plate itself. A front plate can be any of a variety of colors and can have any of a variety of translucencies. In some cases, a front plate is clear and colorless. In some cases, a height extender 180 can be attached to a front plate, as shown in FIG. 9B. In some cases, the height extender is detachable from the front plate. A height extender can extend the effective height of the front plate by about 0.5 inches, about 1 inch, about 1.5 inches, about 2 inches, about 2.5 inches, about 3 inches, or more, or any height in between.

In some cases, a front plate includes one or more channels for attaching an external label (e.g., a printed label) to the front plate. For example, a front plate can include a single channel for attaching an external label. In some cases, a front plate includes two channels for attaching external labels. In some cases, the two channels are parallel to each other, with one channel being positioned on top of the other. Such an embodiment is shown in FIG. 11, and is useful, e.g., for attaching two different external labels (e.g., one label can have a description of the product, while the other can have the price). In some cases, an external label can be attached to a front plate having two channels, such that both channels are substantially occupied by the single label. In such embodiments, the channels of the front plate can accommodate two smaller labels or one larger label. Channels can be defined by one or more external flanges that protrude from the front plate and define grooves for holding external labels. In the embodiment shown in FIG. 11, the front plate includes six external flanges that define eight grooves for external labels. In this embodiment, the two middle flanges each include an upper groove (defining the lower portion of the second channel 102) and a lower groove (defining the upper portion of the first channel 101). In some cases, a front plate can include three or more channels.

In some cases, a product display system includes a pusher mechanism that is detachable. In some cases, a pusher mechanism includes a pusher paddle, a spring, or both that are independently detachable. For example, a pusher mechanism can include a spiral tension spring (also known as a clock spring), as exemplified by the embodiment shown in FIG. 3. A spiral tension spring used in product display systems described herein can have any of a variety of tension strengths. In some cases, a spiral tension spring having a given tension strength can be removed from the product display system and replaced with a different spring having a different tension strength (e.g., to more effectively push products having different weights or other physical properties towards the front plate). In some cases, a spring can be removed and replaced with a different spring having a higher tension strength. In some cases, a spring can be removed and replaced with a different spring having a lower tension strength. In some cases, springs with a variety of tension strengths can be used with product display systems disclosed herein. In some cases, a spring is detachably connected to a front bracket unit of a product display system. For example, in the embodiment exemplified in FIG. 7, the spring 83 is detachably connected to the front bracket unit 160 by a pin 163.

Product display systems disclosed herein can include hanger brackets that are attachable to a horizontal support bar such that the product display system is supported in a substantially horizontal configuration. In some cases, horizontal support bars can support multiple product display systems. Additionally or alternatively, product display systems disclosed herein can include hanger brackets having one or more vertical attachment units, such that the product display system can be supported in a substantially horizontal configuration independently of being attached to a horizontal support bar. For example, hanger brackets having one or more vertical attachment units can be attached to a vertical support bar having one or more receptacles that accommodate and hold the vertical attachment units.

Product display systems disclosed herein can include lighting units. In some cases, lighting units can be removable or replaceable. For example, a front bracket unit can include a lighting housing that can accommodate a removable lighting unit. Such an embodiment is exemplified as shown in FIG. 6A. In the embodiment shown in this figure, lighting unit 201 is detachable from the lighting housing 200 of the front bracket unit 160 of the product display system by means of a lighting unit release tab 202 that can engage a lighting unit release tab catch 26 of the front bracket unit 160. In some cases, a lighting unit and wire are separately removable. For example, the lighting unit can be removed from both the lighting housing and the wire, such that the wire remains connected to the product display system, e.g., to one of the hanger brackets. In some cases, a hanger bracket can include a wire catch, an excess wire retainer, or both, for holding the wire. Such embodiments are advantageous when different lighting units are to be used with a product display system, and ease of replacement is desired. In some cases, a lighting unit includes a lighting source such as a LED. LEDs typically operate with low voltage and power requirements. In some cases, a light source can be a yellow LED. In some cases, a light source can be a white LED. Different LEDs can be used for different purposes, for example to draw consumer's attention to the displayed products. For example, white LEDs can be used to display dairy products, frozen products, or meat products. As another example, yellow LEDs can be used to display produce. LEDs used with product display systems disclosed herein can have any of a variety of color temperatures. Color temperature is measured in degrees Kelvin (K). The color temperature of a LED describes how the light appears when the LED is directly observed by the human eye. For example, a yellow LED can have a color temperature of about 3000K. As another example, a white LED can have a color temperature of about 5000K.

Product display systems disclosed herein can include a locking mechanism for retaining the product display system in a retracted position. For example, the base can include a locking mechanism and the front bracket unit can include a locking tab, such that when the locking mechanism engages the locking tab, the base does not move relative to the front bracket unit along the first axis. An exemplary embodiment of a product display system having a locking mechanism is shown in FIGS. 5A and 5B, in which the locking mechanism 25 includes an auto lock latch 30 that engages a locking tab 162 on the front bracket unit 160. When engaged, the base is held in a fixed, retracted position relative to the front bracket unit. The auto lock latch can be disengaged from the locking tab by pushing the push to release tab, thus allowing the base to extend forward along the first axis relative to the front bracket unit.

Product display systems disclosed herein can also include a retaining mechanism for holding the product display system in an extended position. For example, the base can include an extension tab catch such that when the extension tab catch engages the extension tab of the front bracket unit, the base is held in an extended position and prevented from moving along the first axis relative to the front bracket unit. An exemplary embodiment of a product display system having a retaining mechanism is shown in FIGS. 5A and 5C, in which extension tab catch 38 is engaged with extension tab 161 of the front bracket unit 160. When engaged, the base is held in a fixed, extended position relative to the front bracket unit. In some cases, the base also includes a stop tab 32 that engages with the extension tab 161 of the front bracket unit 160, as show in FIG. 5C. In some cases, the base is held in an extended position by virtue of the extension tab engaging both the extension tab catch and the stop tab of the base; the extension tab catch prevents the base from retracting, while the stop tab prevents the base from extending further relative to the front bracket unit. In some embodiments, the extension tab is disengaged from the extension tab catch by pushing the front plate of the product display system in a direction towards the back of the product display system, thus permitting the product display system to retract.

Also disclosed herein is a selectively detachable lighting housing that can be attached to product display systems. In some cases, a selectively detachable lighting housing (e.g., a lighting housing that can accommodate a removable lighting unit) can include a product display attachment portion for attaching the selectively detachable lighting housing to a product display system. For example, a selectively detachable lighting housing can include a product display attachment portion that includes an elongated tab for insertion into one or more elongated apertures present on a product display system (e.g., the base of a product display system). Additionally or alternatively, a product display system (e.g., the base of a product display system) can include an elongated tab for insertion into one or more elongated apertures present on a product display attachment portion of a selectively detachable lighting housing. Additionally or alternatively, a selectively detachable lighting housing can include a product display attachment portion that includes one or more pegs for insertion into peg holes present on a product display system. Additionally or alternatively, a selectively detachable lighting housing can include a product display attachment portion that includes one or more peg holes for interacting with one or more pegs on a product display system. Such pegs and peg holes can have any suitable cross-sectional shape (e.g., circular, square, rectangular, hexagonal, etc.) so long as the peg can be stably inserted into a peg hole and secure the selectively detachable lighting housing to the product display system. In some cases, a selectively detachable lighting housing includes include a product display attachment portion having bolt holes that can interact with a screw or bolt inserted from or through the product display system (e.g., from or through the base of the product display system). For example, bolt holes can include an internal thread that matches the external thread of an inserted screw or bolt. Alternatively, bolt holes can lack an internal thread, but nevertheless still interact with a screw or bolt inserted from or through the product display system to secure the selectively detachable lighting housing to the product display system. For example, the depth of the bolt hole can be shallow enough such that pitch (the distance from one thread to the next along the length of the bolt or screw) can stably interact with the bolt or screw. In some cases, a screw or bolt that is used to secure a selectively detachable lighting housing to a product display system can be secured with a nut (e.g., a nut having an internal thread that matches the external thread of the screw or bolt). In some cases, a selectively detachable lighting housing can be secured to the product display system with double-sided tape. In some cases, a selectively detachable lighting housing can be secured to the product display system with a foam pad coated with double-sided tape on each side. In some cases, such double-sided tape or foam pad coated with double-sided tape on each side can be used in combination with other securing means (e.g., an elongated tab, peg, bolt hole, etc.) for securing a selectively detachable lighting housing to a product display system.

In some cases, a selectively detachable lighting housing having a product display attachment portion, a product display system (e.g., a base of a product display system), or both can include means for attaching the selectively detachable lighting housing to the product display systems in a plurality of detent positions. For example, a selectively detachable lighting housing can include a product display attachment portion having an elongated tab that can be inserted into one of two or more elongated apertures present on a product display system (e.g., the base of a product display system). Additionally or alternatively, a selectively detachable lighting housing can include a product display attachment portion that includes one or more peg or bolt holes for interacting with pegs, screws, or bolts present on or inserted through a product display system. Having the option to attach the selectively detachable lighting housing to the product display system in a plurality of detent positions provides certain advantages, including but not limited to, the ability to better control the light dynamics of a product display system or systems, the ability to accommodate different spatial constraints for a product display system, the ability to accommodate different shopping environments (e.g. aisle width), and the ability to accommodate different lengths of wire for providing power to the detachable lighting housing.

Figure 14A:
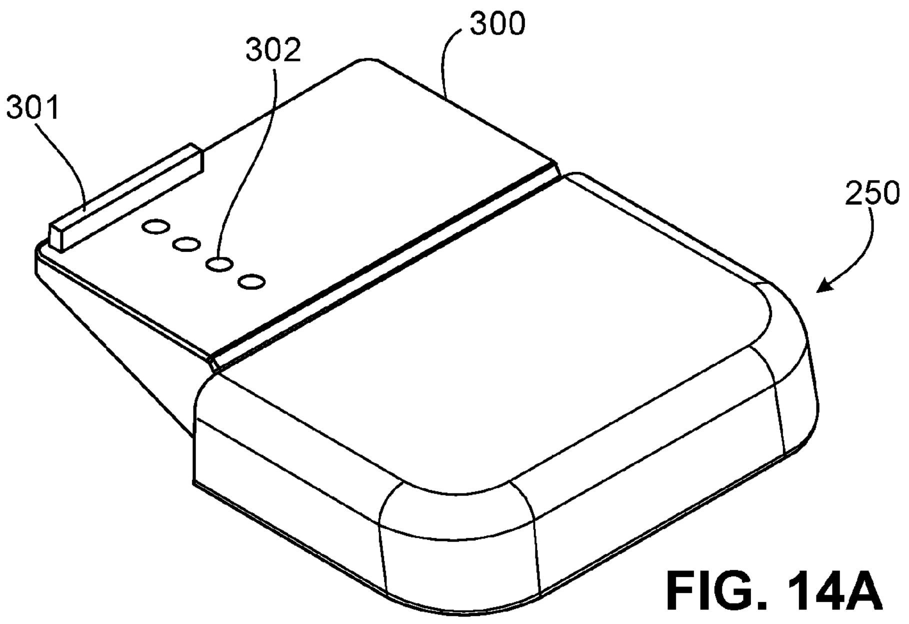
FIG. 14A shows a top perspective view of an exemplary selectively detachable lighting housing having a product display attachment portion.
Figure 14B:
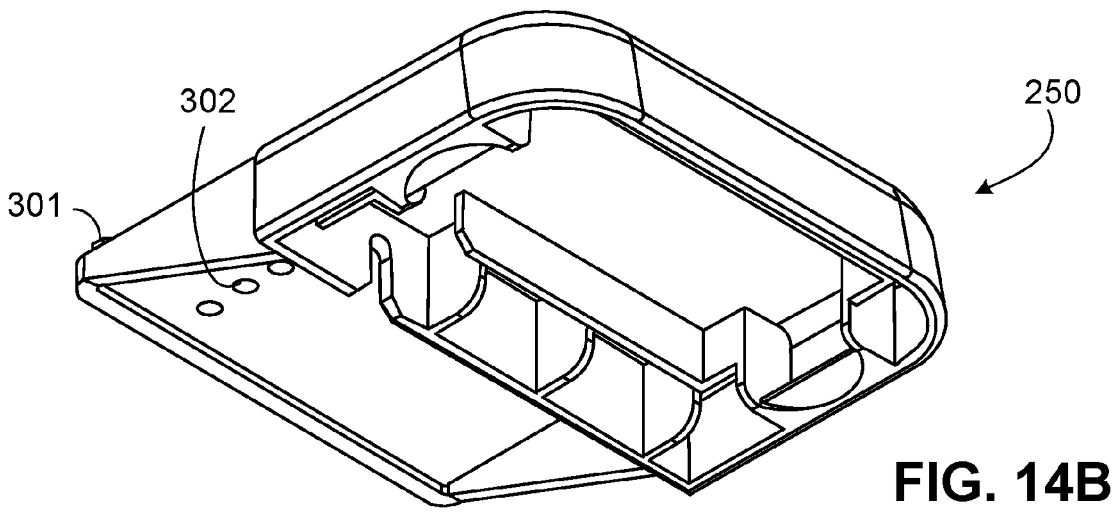
FIG. 14B shows an exemplary bottom perspective view of an exemplary selectively detachable lighting housing having a product display attachment portion.
Figure 15A:
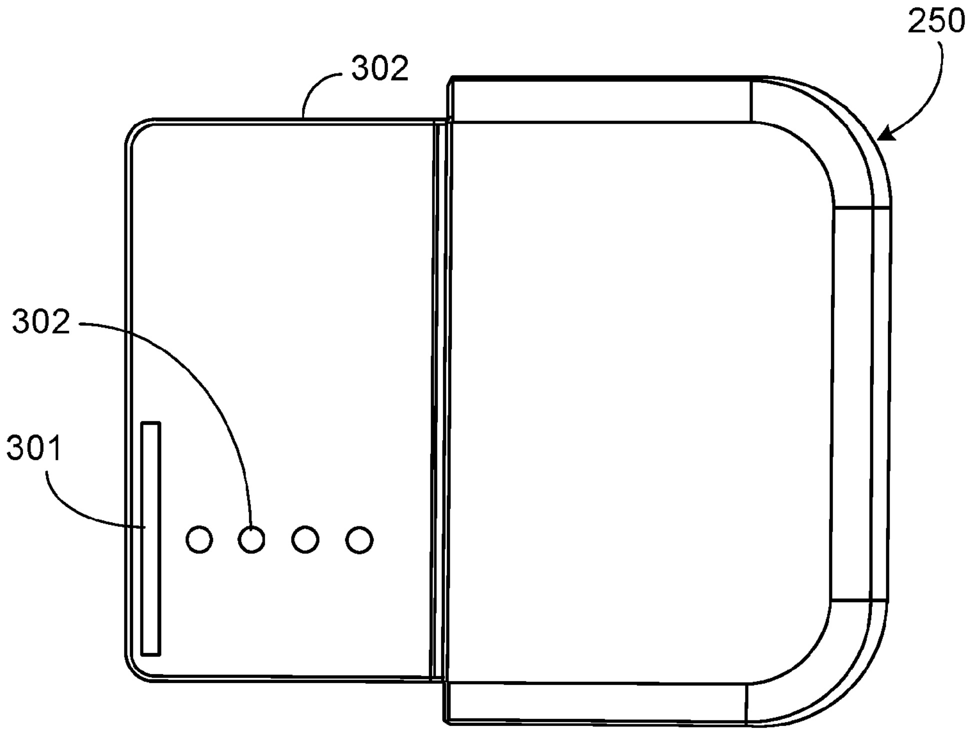
FIG. 15A shows a top view of an exemplary selectively detachable lighting housing having a product display attachment portion.
Figure 15B:
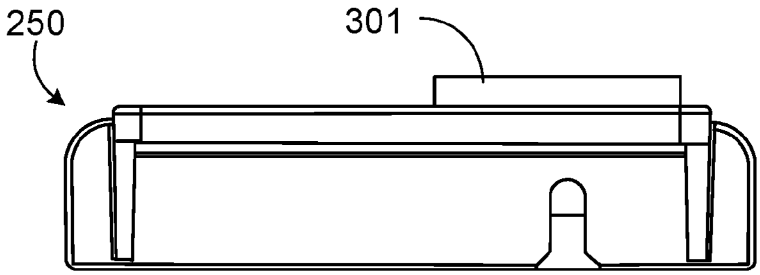
FIG. 15B shows a rear view of an exemplary selectively detachable lighting housing having a product display attachment portion.
Figure 15C:
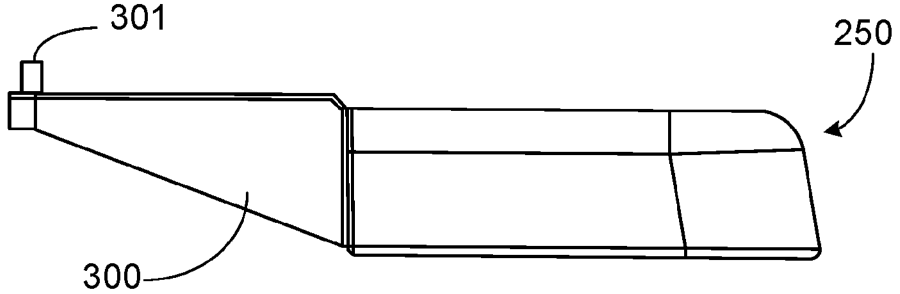
FIG. 15C shows a side view of an exemplary selectively detachable lighting housing having a product display attachment portion.
Figure 15D:
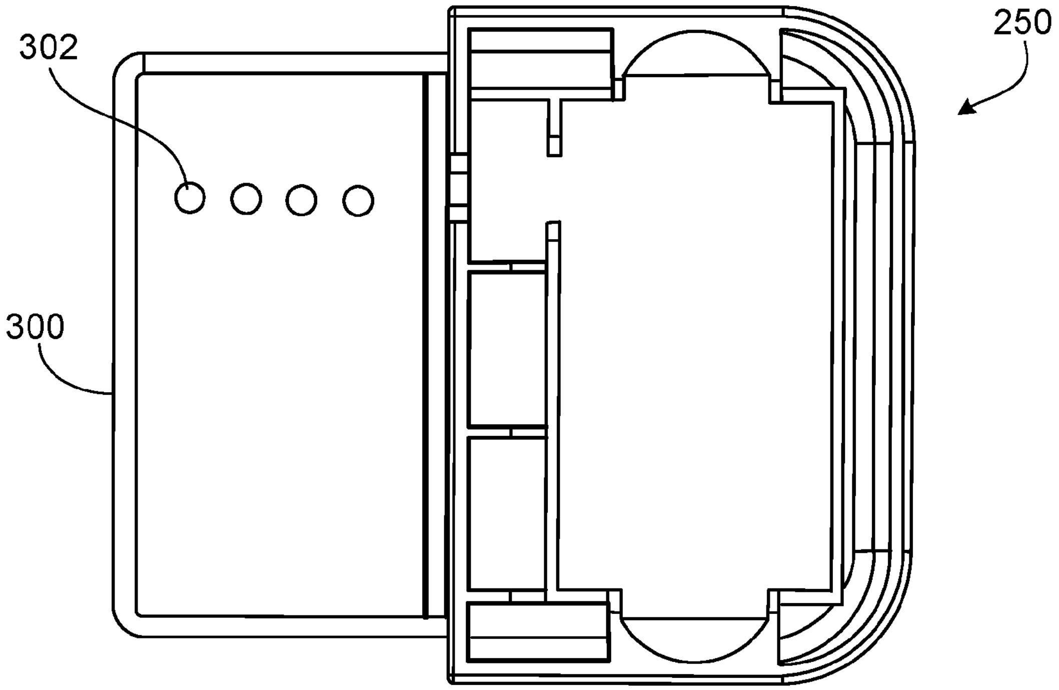
FIG. 15D shows a bottom view of an exemplary selectively detachable lighting housing having a product display attachment portion.

An exemplary selectively detachable lighting housing having a product display attachment portion is shown in FIGS. 14A and 14B. FIGS. 14A and 14B show a top and bottom perspective view, respectively, of an exemplary selectively detachable lighting housing 250 having a product display attachment means 300 with an elongated tab 301 and four peg or bolt holes 302. FIGS. 15A, 15B, 15C, and 15D show top, rear, side, and bottom views, respectively, of an exemplary selectively detachable lighting housing 250 having a product display attachment portion 300. In FIGS. 15A, 15B, 15C, and 15D, the elongated tab 301 and peg or bolt holes 302 are indicated.

Figure 16:
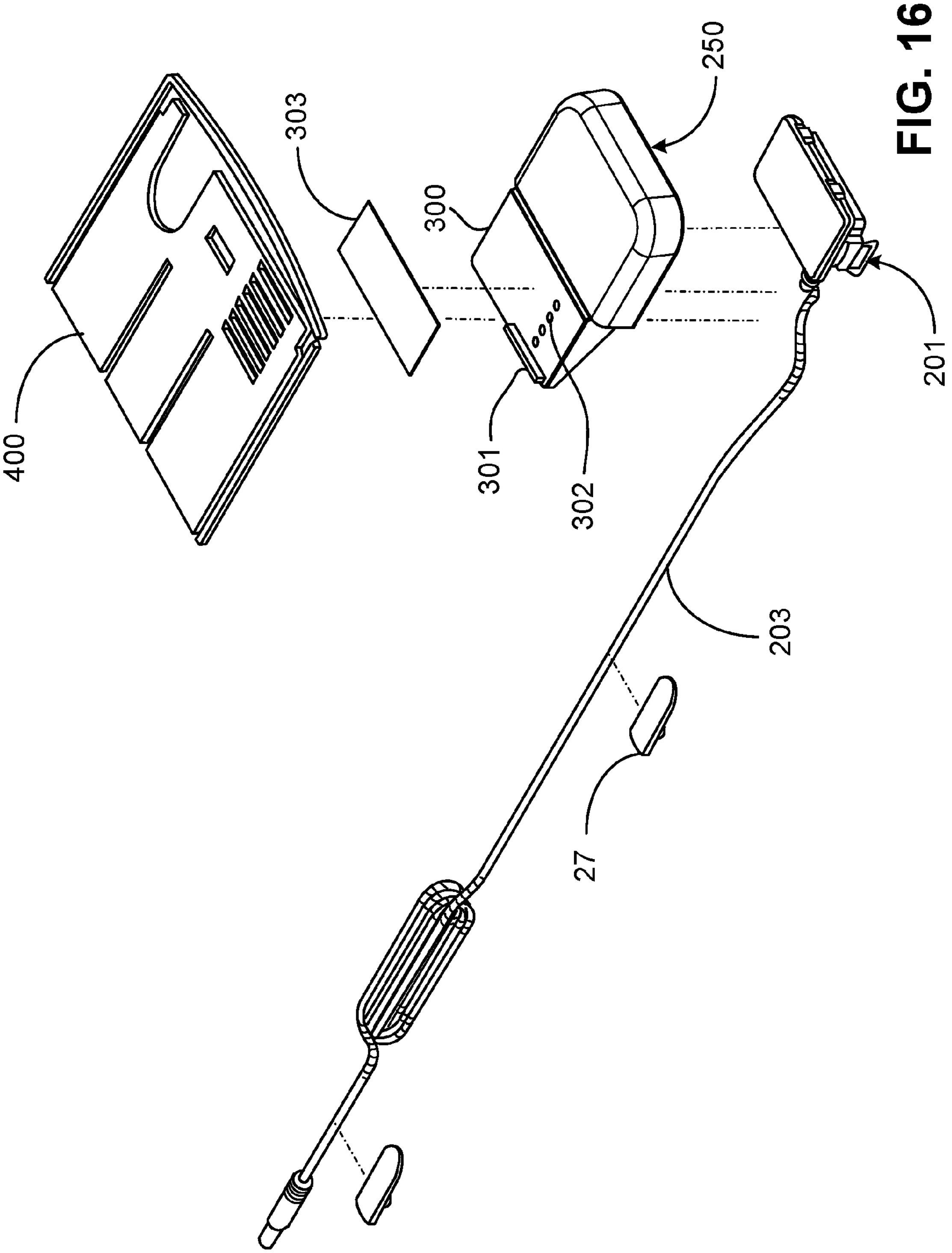
FIG. 16 shows an exploded top perspective view of a partial base of an exemplary product display system, an exemplary selectively detachable lighting housing having a product display attachment portion, and an exemplary lighting unit.

FIG. 16 shows an exploded top perspective view of a partial base of an exemplary product display system, an exemplary selectively detachable lighting housing having a product display attachment portion, and an exemplary lighting unit. In the exemplary embodiment shown in FIG. 16, lighting unit 201 is shown removed from selectively detachable lighting housing 250. Wire 203 provides power to lighting unit 201. Wire catch 27 is for holding excess wire 203. Selectively detachable lighting housing 250 includes a product display attachment portion 300 with an elongated tab 301 and four peg or bolt holes 302. Elongated tab 301 can insert into one of the elongated apertures 304 on base 400 of a product display system. Additionally or alternatively, pegs, screws, or bolts (not shown) can be inserted through one or more of the elongated apertures 304 into peg or bolt holes 302 to secure product display attachment portion 300 of selectively detachable lighting housing 250 to base 400 of a product display system. Double-sided adhesive tape 303 is used to further secure product display attachment portion 300 of selectively detachable lighting housing 250 to base 400 of a product display system.

It is to be understood that while the disclosure has been described in conjunction with the detailed description thereof, the foregoing description is intended to illustrate and not limit the scope of the disclosure, which is defined by the scope of the appended claims. Other aspects, advantages, and modifications are within the scope of the following claims.

What is claimed is:

1. A product display system comprising:

(a) a base comprising an upper surface, a lower surface, and defining a first axis;

(b) a first side wall and a second side wall each slidably coupled to said base and comprising:

(i) a wall portion that extends away from said upper surface of said base, and (ii) a lower portion comprising a lower surface that is at least partially positioned on top of said upper surface of said base, wherein said lower portions of said first and second side walls are slidable over said upper surface of said base along an axis perpendicular to said first axis;

(c) a first support plate and a second support plate, each first and second support plate comprising an upper surface and a lower surface, wherein said first and second support plates are connected to said base;

(d) a pusher mechanism comprising a pusher paddle and a spring, wherein said pusher paddle is moveable relative to said base along said first axis;

(e) a front plate;

(f) a first hanger bracket and a second hanger bracket each slidably coupled to said base, wherein said first and second hanger brackets are positioned on opposing lateral sides of said base, wherein said first and second hanger brackets are attachable to a support bar such that said product display system is supported in a substantially horizontal configuration;

wherein said base is slidable along said first axis relative to said first and second hanger brackets; and wherein said first side wall is slidable over said first hanger bracket, and said second side wall is slidable over said second hanger bracket; and (g) a front bracket unit connected to said first and second hanger brackets comprising an extension tab releasably coupleable with said base for detaining said base in an extended position relative to said first and second hanger brackets; further comprising a lighting unit couple to said front bracket.

2. The product display system of claim 1, wherein said lighting unit comprises a lighting source, a wire for conducting power to said lighting source, a lighting unit side tab, and a lighting unit release tab; and wherein said lighting housing further comprises:

(a) a lighting unit release tab catch for engaging said lighting unit release tab; and (b) a lighting unit side tab catch for engaging said lighting unit side tab.

3. The product display system of claim 2, wherein said lighting source is a LED.

4. The product display system of claim 3, wherein said LED emits yellow light or white light.

5. The product display system of claim 2, wherein said LED is removable from said lighting unit.

6. The product display system of claim 2, wherein said at least one of said first or second hanger brackets comprises a wire catch, an excess wire retainer, or both, for holding said wire.

7. The product display system of claim 2, further comprising a power bar comprising one or more power inlets for accepting power, and one or more power outlets for supplying power to said lighting unit.

8. The product display system of claim 7, wherein said power bar is magnetic such that it can be magnetically attached to a support surface.

* * * * *